United States Patent
Bai et al.

(10) Patent No.: US 12,369,165 B2
(45) Date of Patent: Jul. 22, 2025

(54) DIFFERENT BEAM APPLICATION TIME DURATIONS FOR SAME OR CROSS TRP BEAM INDICATION

(71) Applicant: QUALCOMM Incorporated, San Diego, CA (US)

(72) Inventors: Tianyang Bai, Somerville, NJ (US); Yan Zhou, San Diego, CA (US); Mostafa Khoshnevisan, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 18/050,432

(22) Filed: Oct. 27, 2022

(65) Prior Publication Data

US 2024/0147484 A1     May 2, 2024

(51) Int. Cl.
*H04W 72/23*     (2023.01)
*H04B 7/06*     (2006.01)
*H04L 5/00*     (2006.01)

(52) U.S. Cl.
CPC .......... *H04W 72/23* (2023.01); *H04B 7/0695* (2013.01); *H04L 5/0053* (2013.01); *H04L 5/0092* (2013.01)

(58) Field of Classification Search
None
See application file for complete search history.

(56) References Cited

U.S. PATENT DOCUMENTS

| | | | |
|---|---|---|---|
| 2019/0215701 A1* | 7/2019 | Honglei | H04B 7/0617 |
| 2020/0112974 A1* | 4/2020 | Sun | H04W 72/23 |
| 2020/0351892 A1* | 11/2020 | Yi | H04L 5/0092 |
| 2021/0243659 A1* | 8/2021 | Cirik | H04L 5/0048 |
| 2022/0116859 A1* | 4/2022 | Park | H04L 5/0023 |
| 2022/0210818 A1* | 6/2022 | Cirik | H04W 72/232 |
| 2022/0225135 A1* | 7/2022 | Cirik | H04W 72/046 |
| 2023/0180242 A1* | 6/2023 | Cirik | H04L 5/0023 370/329 |
| 2023/0198723 A1* | 6/2023 | Sun | H04B 7/088 370/329 |

(Continued)

*Primary Examiner* — Otis L Thompson, Jr.
(74) *Attorney, Agent, or Firm* — Procopio, Cory, Hargreaves & Savitch LLP/Qualcomm

(57) ABSTRACT

A method for wireless communication at a user equipment (UE) and related apparatus are provided. In the method, the UE receives a configuration of multiple application time values for transmission configuration indication (TCI) state updates. The UE further receives downlink control information (DCI) in a control resource set (CORESET) associated with a first CORESET pool index associated with a first transmission reception point (TRP) and including a transmission configuration indication (TCI) state associated with a second CORESET pool index associated with a second TRP. The UE further transmits acknowledgement/negative acknowledgement (ACK/NACK) feedback to one or more TRPs based on a feedback mode configured for the UE, and applies the TCI state indicated in the DCI following the ACK/NACK feedback based on one of the multiple application time values and the feedback mode.

30 Claims, 16 Drawing Sheets

(56) References Cited

U.S. PATENT DOCUMENTS

| | | | |
|---|---|---|---|
| 2023/0328830 A1* | 10/2023 | Yi | H04W 76/19 |
| | | | 370/329 |
| 2023/0337255 A1* | 10/2023 | Lo | H04W 72/232 |
| 2023/0396375 A1* | 12/2023 | Muruganathan | H04L 5/0023 |
| 2024/0039582 A1* | 2/2024 | Shahmohammadian | |
| | | | H04W 72/23 |
| 2024/0048302 A1* | 2/2024 | He | H04L 5/0035 |
| 2024/0205695 A1* | 6/2024 | Muruganathan | H04L 5/0069 |

* cited by examiner

DIFFERENT BEAM APPLICATION TIME DURATIONS FOR SAME OR CROSS TRP BEAM INDICATION

TECHNICAL FIELD

The present disclosure relates generally to communication systems, and more particularly, to wireless communication with different beam application time durations for same or cross transmission/reception point (TRP) beam indication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In one aspect of the disclosure, a method, a computer-readable medium, and an apparatus are provided for wireless communication at a user equipment (UE). The apparatus may include memory; and at least one processor coupled to the memory and configured to receive a configuration of multiple application time values for transmission configuration indication (TCI) state updates; receive downlink control information (DCI) in a control resource set (CORESET) associated with a first CORESET pool index associated with a first transmission reception point (TRP) and including a transmission configuration indication (TCI) state associated with a second CORESET pool index associated with a second TRP; transmit acknowledgement/negative acknowledgement (ACK/NACK) feedback to one or more TRPs based on a feedback mode configured for the UE; and apply the TCI state indicated in the DCI following the ACK/NACK feedback based on one of the multiple application time values and the feedback mode.

In another aspect of the disclosure, a method, a computer-readable medium, and an apparatus are provided for wireless communication at a network entity. The apparatus may include memory; and at least one processor coupled to the memory and configured to configure multiple application time values for TCI state updates for a UE; provide DCI in a CORESET associated with a first CORESET pool index associated with a first TRP and including a TCI state associated with a second CORESET pool index associated with a second TRP; receive ACK/NACK feedback from the UE at one or more TRPs based on a feedback mode configured for the UE; and apply the TCI state indicated in the DCI following the ACK/NACK feedback based on one of the multiple application time values and the feedback mode.

In yet another aspect of the disclosure, a method, a computer-readable medium, and an apparatus are provided for wireless communication at a network entity. The apparatus may include memory; and at least one processor coupled to the memory and configured to configure a single application time for different types of TCI state updates for a UE, the different types of TCI state updates including a first type of TCI state update from a same TRP to which the TCI is to be applied and a cross-TRP TCI state update; provide DCI in a CORESET associated with a first CORESET pool index associated with a first TRP and including a TCI state associated with a second CORESET pool index associated with a second TRP; receive ACK/NACK feedback from the UE at one or more TRPs based on a feedback mode configured for the UE; and apply the TCI state indicated in the DCI following the ACK/NACK feedback based on the single application time.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
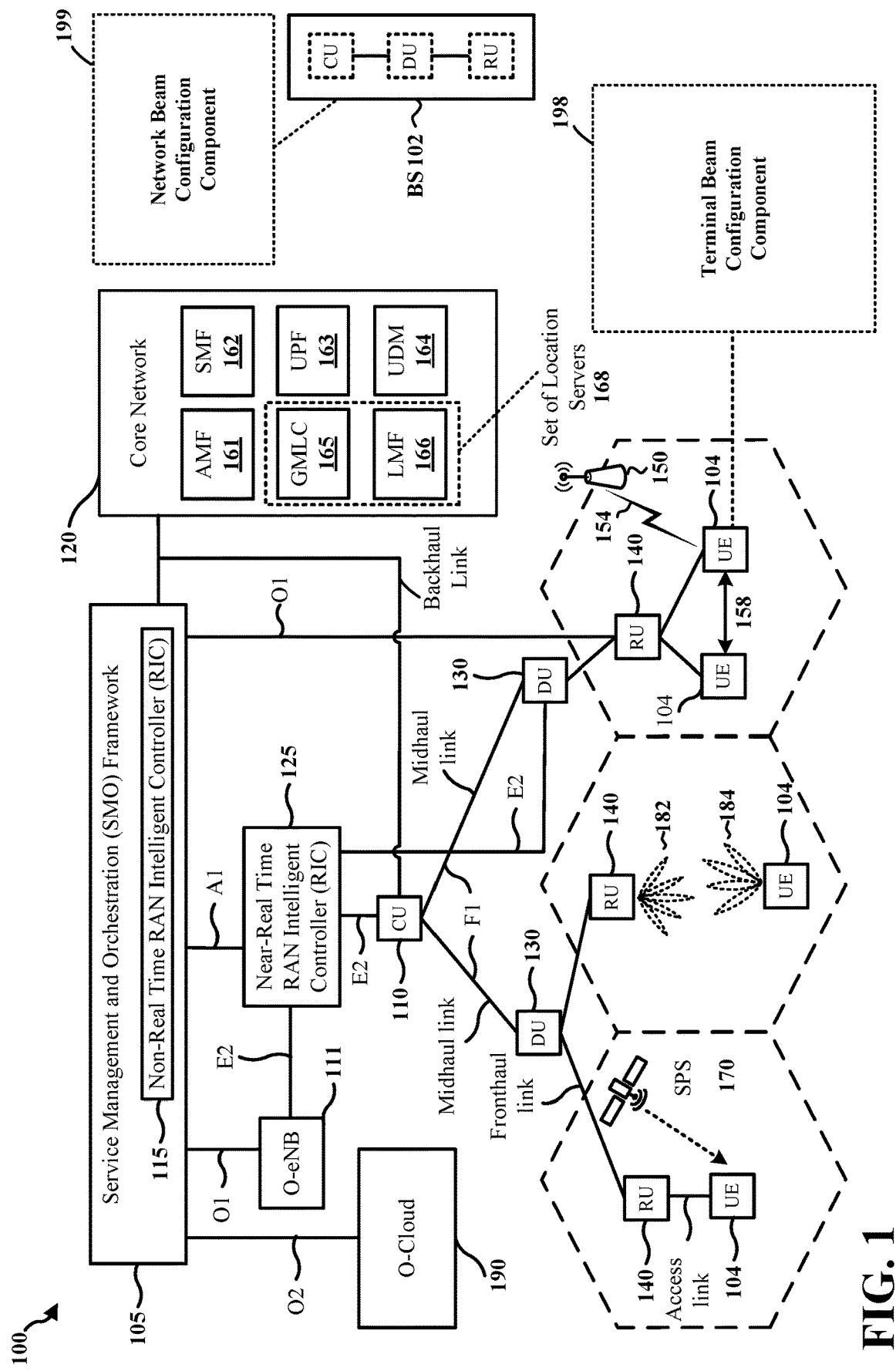
FIG. 1 is a diagram illustrating an example of a wireless communication system and an access network.

A network may send DCI to a UE that provides a beam indication for wireless communication with the UE, the DCI being based on a unified TCI framework. A TCI framework may be designed to work for beam indications for a single TRP. Aspects presented herein include methods and apparatus that enable cross-TRP beam indications, e.g., in DCI from a first TRP that indicates a beam for communication via a second TRP. As presented herein provide for a UE to receive a configuration of multiple application time values for TCI state updates and to receive DCI in a CORESET associated with a first CORESET pool index associated with a first TRP and including a TCI state associated with a second CORESET pool index associated with a second TRP. The UE may further transmit ACK/NACK feedback to one or more TRPs based on a feedback mode configured for the UE, and apply the TCI state indicated in the DCI following the ACK/NACK feedback based on one of the multiple application time values and the feedback mode. The method improves the flexibility for base station scheduling, lowers the overhead and latency, and improves the reliability of wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Various aspects relate generally to wireless communication and, more particularly, to wireless communication with different beam application time durations for same-TRP or cross-TRP beam indication. Some aspects more specifically relate to cross-TRP beam indication in multi-DCI (mDCI) and multi-TRP (mTRP) scenarios. In some examples, a UE may receive a configuration of multiple application time values for TCI state updates and receive DCI in a CORESET associated with a first CORESET pool index associated with a first TRP and a TCI state associated with a second CORESET pool index associated with a second TRP. The UE may further transmit ACK/NACK feedback to one or more TRPs based on a feedback mode configured for the UE and apply the TCI state indicated in the DCI following the ACK/NACK feedback based on one of the multiple application time values and the feedback mode. In some aspects, the feedback mode may be one of a joint feedback mode, in which the UE transmits the ACK/NACK feedback to the first TRP, and a separate feedback mode, in which the UE transmits the ACK/NACK feedback to the first TRP from which the DCI is received and the second TRP associated with the TCI state indicated in the DCI.

Particular aspects of the subject matter described in this disclosure can be implemented to realize one or more of the following potential advantages. In some examples, since DCI for one TRP may include a TCI state update for another TRP, the described techniques allow a DCI for a first TRP to be used to indicate a TRP beam change for a second TRP, for example, when the DCI for the second TRP is not reliable, which improves the reliability of wireless communication. Additionally, the described techniques enable the base station to use a single DCI to communicate with multiple TRPs (e.g., scheduling data for one TRP and indicating a beam change for another TRP) at the same time, which improves the flexibility for base station scheduling and lowers the overhead and latency of wireless communication.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other.

Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a terminal beam configuration component 198. The terminal beam configuration component 198 be configured to receive a configuration of multiple application time values for TCI state updates, and receive DCI in a CORESET associated with a first CORESET pool index associated with a first TRP and including a TCI state associated with a second CORESET pool index associated with a second TRP. The terminal beam configuration component 198 may be further configured to transmit ACK/NACK feedback to one or more TRPs based on a feedback mode configured for the UE, and apply the TCI state indicated in the DCI following the ACK/NACK feedback based on one of the multiple application time values and the feedback mode. In certain aspects, the base station 102 may include a network beam configuration component 199. The network beam configuration component 199 be configured to configure multiple application time values for TCI state updates for a UE; provide DCI in a CORESET associated with a first CORESET pool index associated with a first TRP and including a TCI state associated with a second CORESET pool index associated with a second TRP; receive ACK/NACK feedback from the UE at one or more TRPs based on a feedback mode configured for the UE; and apply the TCI state indicated in the DCI following the ACK/NACK feedback based on one of the multiple application time values and the feedback mode. In some aspects, the network beam configuration component 199 may be configured to configure a single application time for different types of TCI state updates for a UE, the different types of TCI state updates including a first type of TCI state update from a same TRP to which the TCI is to be applied and a cross-TRP TCI state update; provide DCI in a CORESET associated with a first CORESET pool index associated with a first TRP and including a TCI state associated with a second CORESET pool index associated with a second TRP; receive ACK/NACK feedback from the UE at one or more TRPs based on a feedback mode configured for the UE; and apply the TCI state indicated in the DCI following the ACK/NACK feedback based on the single application time. Although the following description may be focused on 5G NR, the concepts described herein may be applicable to other similar areas, such as LTE, LTE-A, CDMA, GSM, and other wireless technologies.

Figure 2:
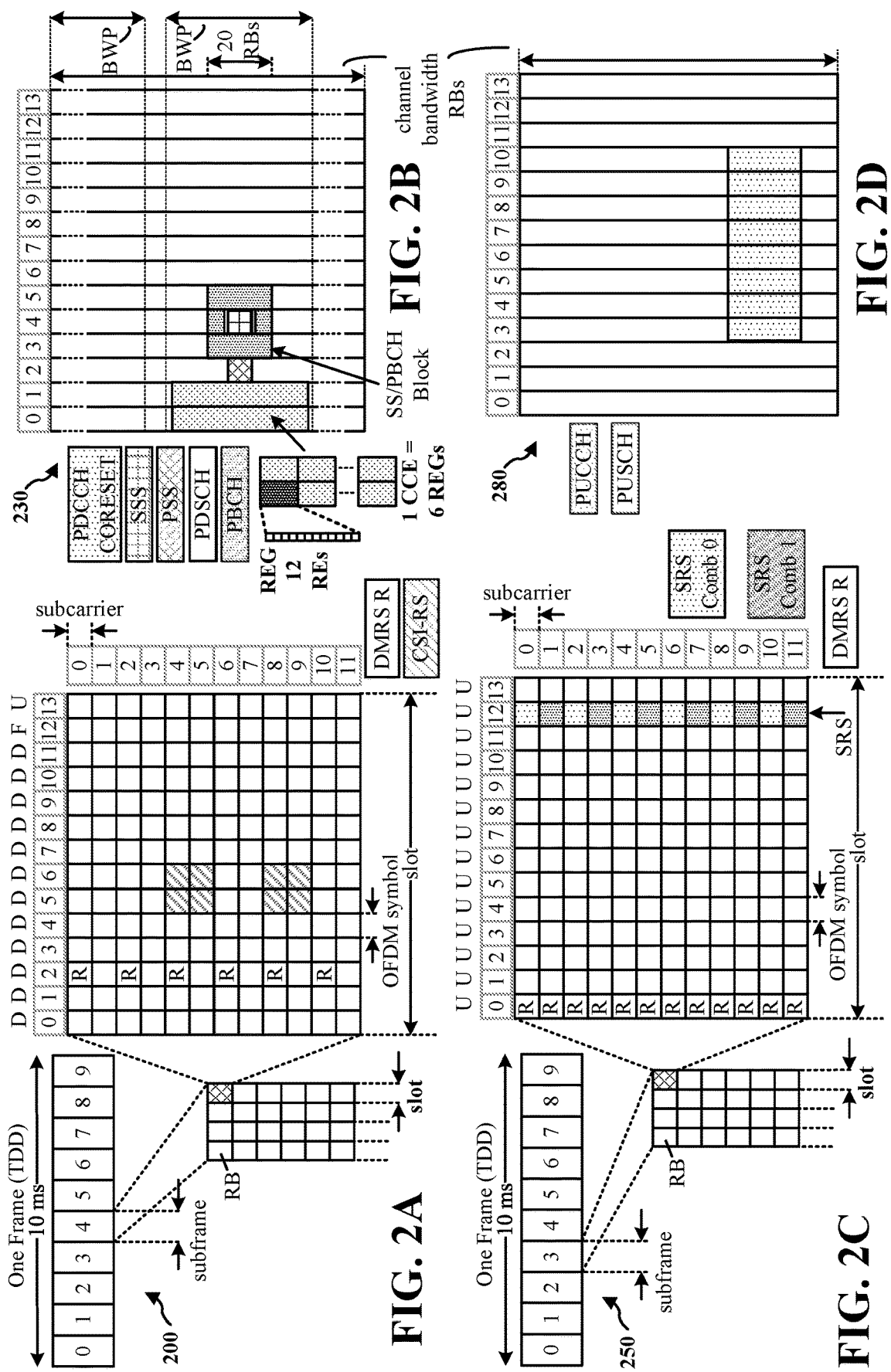
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| µ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies µ 0 to 4 allow for 1, 2, 4, 8, and 16 slots, respectively, per subframe. For extended CP, the numerology 2 allows for 4 slots per subframe. Accordingly, for normal CP and numerology µ, there are 14 symbols/slot and 2 slots/subframe. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of normal CP with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
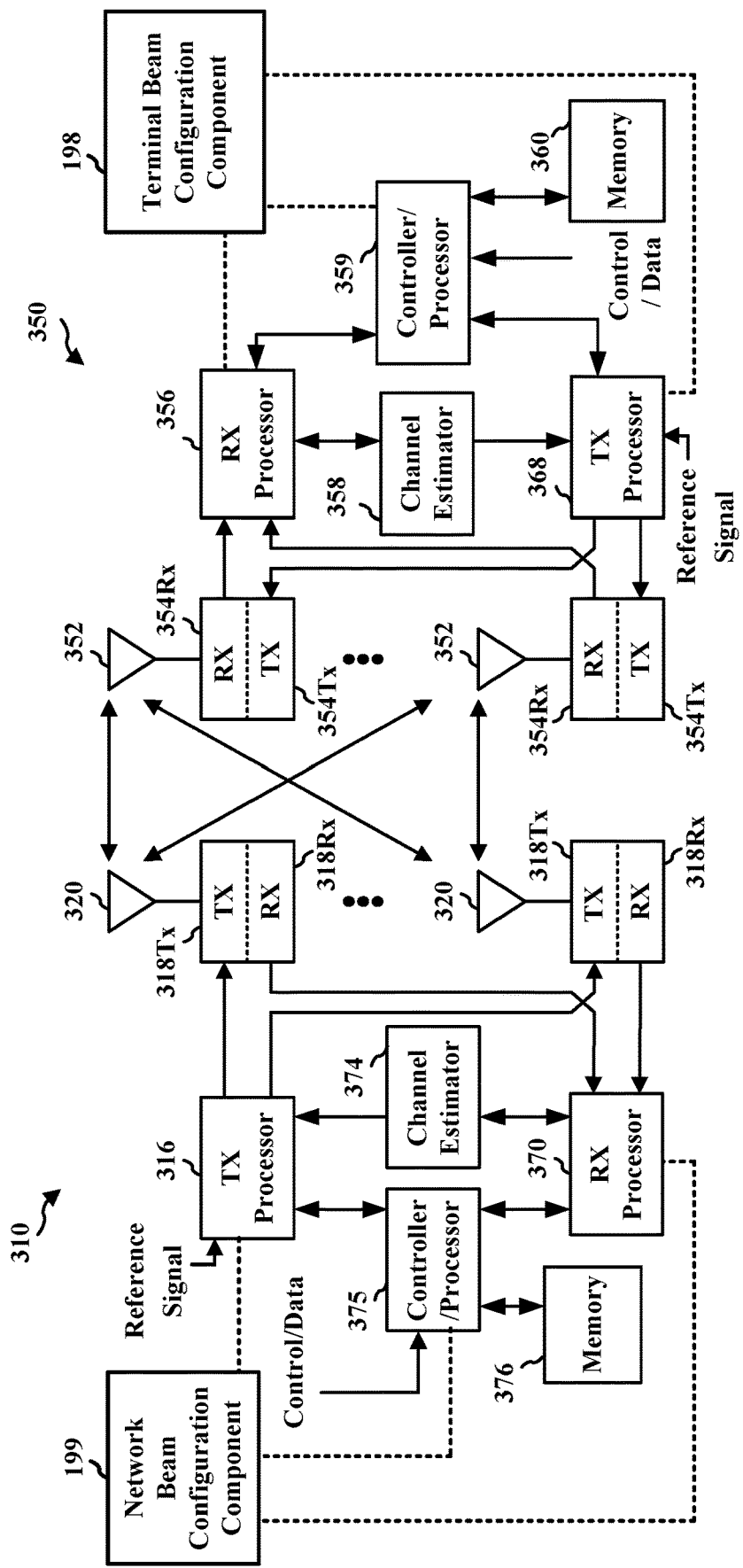
FIG. 3 is a diagram illustrating an example of a base station and UE in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the terminal beam configuration component 198 of FIG. 1.

At least one of the TX processor 316, the RX processor 370, and the controller/processor 375 may be configured to perform aspects in connection with the network beam configuration component 199 of FIG. 1.

Figure 4:
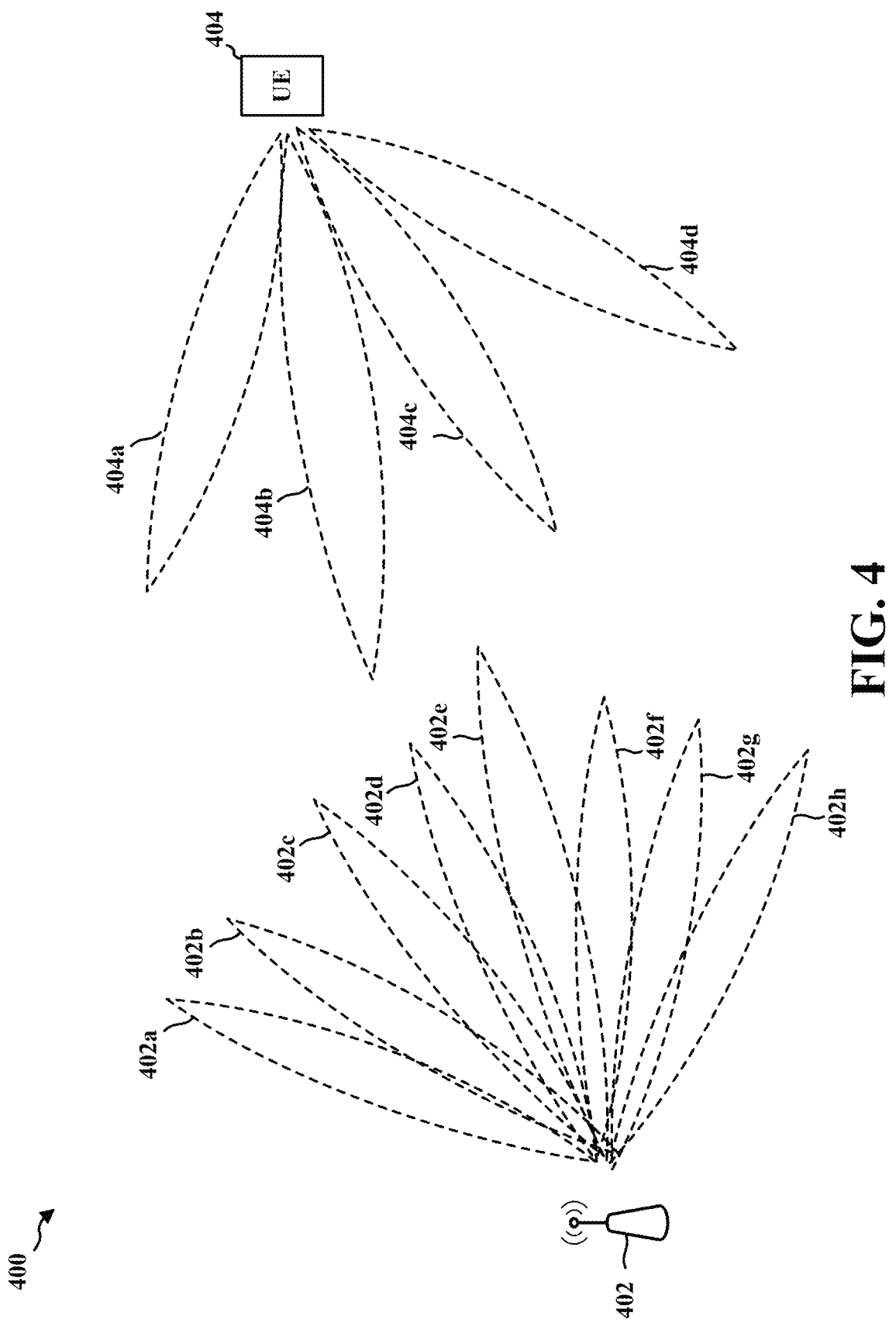
FIG. 4 is a diagram illustrating example communications between a base station and a UE for beamforming in accordance with various aspects of the present disclosure.

As described in connection with example 400 in FIG. 4, the base station 402 and UE 404 may communicate over active data/control beams both for DL communication and UL communication. The base station 402 and/or UE 404 may switch to a new beam direction using beam failure recovery procedures. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In response to different conditions, the UE 404 may determine to switch beams, e.g., between beams at directions 402a-402h. The beam at the UE 404 may be used for the reception of downlink communication and/or transmission of uplink communication. In some examples, the base station 402 may send a transmission that triggers a beam switch by the UE 404. For example, the base station 402 may indicate a transmission configuration indication (TCI) state change, and in response, the UE 404 may switch to a new beam for the new TCI state of the base station 402. In some instances, a UE may receive a signal, from a base station, configured to trigger a transmission configuration indication (TCI) state change via, for example, a MAC control element (CE) command. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication. In some aspects, a single MAC-CE command may be sent by the base station to trigger the changing of the TCI state on multiple CCs.

A TCI state may include quasi co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed. The base station may indicate a TCI state to the UE as a transmission configuration that indicates QCL relationships between one signal (e.g., a reference signal) and the signal to be transmitted/received. For example, a TCI state may indicate a QCL relationship between DL RSs in one RS set and PDSCH/PDCCH DM-RS ports. TCI states can provide information about different beam selections for the UE to use for transmitting/receiving various signals. Under a unified TCI framework, different types of common TCI states may be indicated. For example, a type 1 TCI may be a joint DL/UL common TCI state to indicate a common beam for at least one DL channel or RS and at least one UL channel or RS. A type 2 TCI may be a separate DL (e.g., separate from UL) common TCI state to indicate a common beam for more than one DL channel or RS. A type 3 TCI may be a separate UL common TCI state to indicate a common beam for more than one UL channel/RS. A type 4 TCI may be a separate DL single channel or RS TCI state to indicate a beam for a single DL channel or RS. A type 5 TCI may be a separate UL single channel or RS TCI state to indicate a beam for a single UL channel or RS. A type 6 TCI may include UL spatial relation information (e.g., such as sounding reference signal (SRS) resource indicator (SRI)) to indicate a beam for a single UL channel or RS. An example RS may be an SSB, a tracking reference signal (TRS) and associated CSI-RS for tracking, a CSI-RS for beam management, a CSI-RS for CQI management, a DM-RS associated with non-UE-dedicated reception on PDSCH and a subset (which may be a full set) of control resource sets (CORESETs), or the like. A TCI state may be defined to represent at least one source RS to provide a reference (e.g., UE assumption) for determining quasi-co-location (QCL) or spatial filters. For example, a TCI state may define a QCL assumption between a source RS and a target RS.

Before receiving a TCI state, a UE may assume that the antenna ports of one DM-RS port group of a PDSCH are spatially quasi-co-located (QCLed) with an SSB determined in the initial access procedure with respect to one or more of: a Doppler shift, a Doppler spread, an average delay, a delay spread, a set of spatial Rx parameters, or the like. After receiving the new TCI state, the UE may assume that the antenna ports of one DM-RS port group of a PDSCH of a serving cell are QCLed with the RS(s) in the RS set with respect to the QCL type parameter(s) given by the indicated TCI state. Regarding the QCL types, QCL type A may include the Doppler shift, the Doppler spread, the average delay, and the delay spread; QCL type B may include the Doppler shift and the Doppler spread; QCL type C may include the Doppler shift and the average delay; and QCL type D may include the spatial Rx parameters (e.g., associated with beam information such as beamforming properties for finding a beam).

In another aspect, a spatial relation change, such as a spatial relation update, may trigger the UE to switch beams. Beamforming may be applied to uplink channels, such as but not limited to PUCCH. Beamforming may be based on configuring one or more spatial relations between the uplink and downlink signals. Spatial relation indicates that a UE may transmit the uplink signal using the same beam as it used for receiving the corresponding downlink signal.

In another aspect, the base station 402 may change a pathloss reference signal configuration that the UE uses to determine power control for uplink transmissions, such as SRS, PUCCH, and/or PUSCH. In response to the change in the pathloss reference signal, the UE 404 may determine to switch to a new beam.

A wireless device may include and/or communicate with multiple TRPs. Each TRP may include different RF modules having a shared hardware and/or software controller. Each TRP may have separate RF and digital processing. Each TRP may also perform separate baseband processing. Each TRP may include a different antenna panel or a different set of antenna elements of a wireless device. The TRPs of the wireless device may be physically separated. For example, TRPs on a wireless device of a vehicle may be located at different locations of the vehicle. As another example, a network may communicate with a UE via multiple TRPs. As an example, a network node may exchange communication with the UE via different TRPs. Each of the TRPs may experience a channel differently (e.g., experience a different channel quality) due to the difference in physical location, the distance between the TRPs, different line-of-sight (LOS) characteristics (e.g., a LOS channel in comparison to a non-LOS (NLOS) channel), blocking/obstructions, interference from other transmissions, among other reasons.

A wireless network may include multiple transmission and reception points (TRPs) to improve reliability, coverage, and capacity for communication with UEs. Multi-TRP communication may include dynamic coordination between the multiple TRPs, to provide joint scheduling and transmission/reception for the UE. In this way, a UE at the cell edge can be served by multiple TRPs to improve its signal transmission/reception resulting in increased throughput. In some examples, control signals may be transmitted to a UE from multiple TRPs, e.g., to improve reliability for URLLC, V2X, high speed UEs, among other examples. The control signaling from multiple TRPs may provide link diversity gain and improve reception for UEs that are near a cell edge. In devices that communicate using multiple beams, such multi-TRP communication may include beam management procedures.

Figures 5A, 5B, 5C:
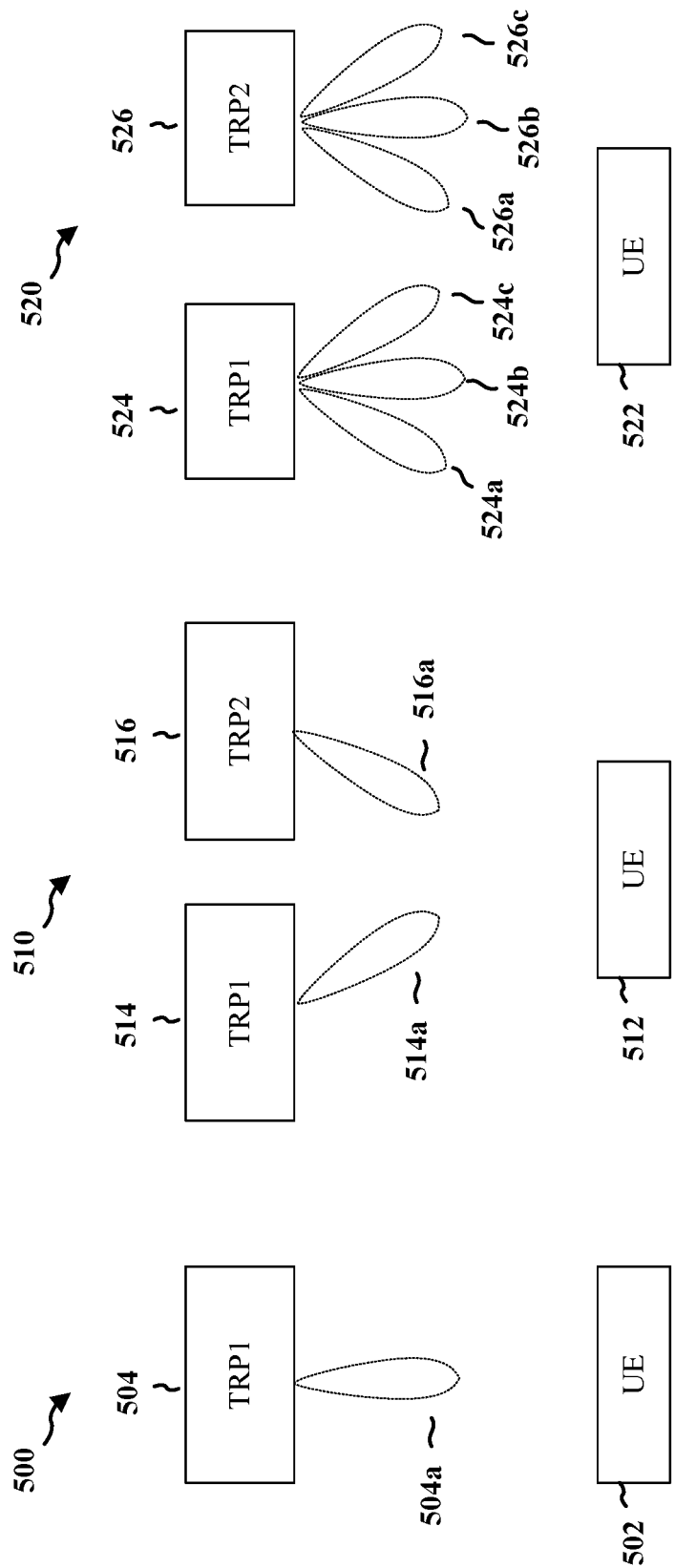
FIGS. 5A, 5B and 5C are diagrams illustrating different examples of a UE having a connection to a network.

FIGS. 5A, 5B, and 5C illustrate different examples of a UE having a connection to a network. As shown in FIG. 5A, in example 500, the UE 502 has a connection with a single TRP 504 using a single beam 504a. As shown in FIG. 5B, in example 510, the UE 512 has a connection through multiple TRPs (e.g., TRP1 514 and TRP2 516) using a single beam for each TRP (e.g., beam 514a for TRP1 514, beam 516a for TRP2 516). As shown in FIG. 5C, in example 520, the UE 522 has a connection through multiple TRPs (e.g., TRP1 524 and TRP2 526) using multiple beams for each TRP (e.g., beams 524a, 524b, 524c for TRP1 524, beams 526a, 526b, 526c for TRP2 526). In some aspects, the UE may receive control signaling, e.g., PDCCH, from one TRP that schedules communication, e.g., PDSCH and/or PUSCH with multiple TRPs. For example, the UE may receive DCI from one TRP scheduling PDSCH from one or more of the multiple TRPs. In some aspects, the reception of DCI from a single TRP may be referred to as single DCI based multiple TRP operation. In some aspects, the UE may receive control signaling, e.g., PDCCH, from multiple TRPs for the communication with the multiple TRPs. For example, the UE may receive multiple DCI, e.g., a first DCI from the first TRP scheduling PDSCH from the first TRP, and a second DCI from the second TRP scheduling PDSCH from the second TRP. In some aspects, the reception of multiple DCI from multiple TRPs may be referred to as multi-DCI based multiple TRP operation. In some aspects, the UE may receive PUSCH from the multiple TRPs, or may receive overlapping PUCCH from the multiple TRPS, but does not receive PUSCH from one TRP while receiving PUCCH from the other TRP.

Figure 6:
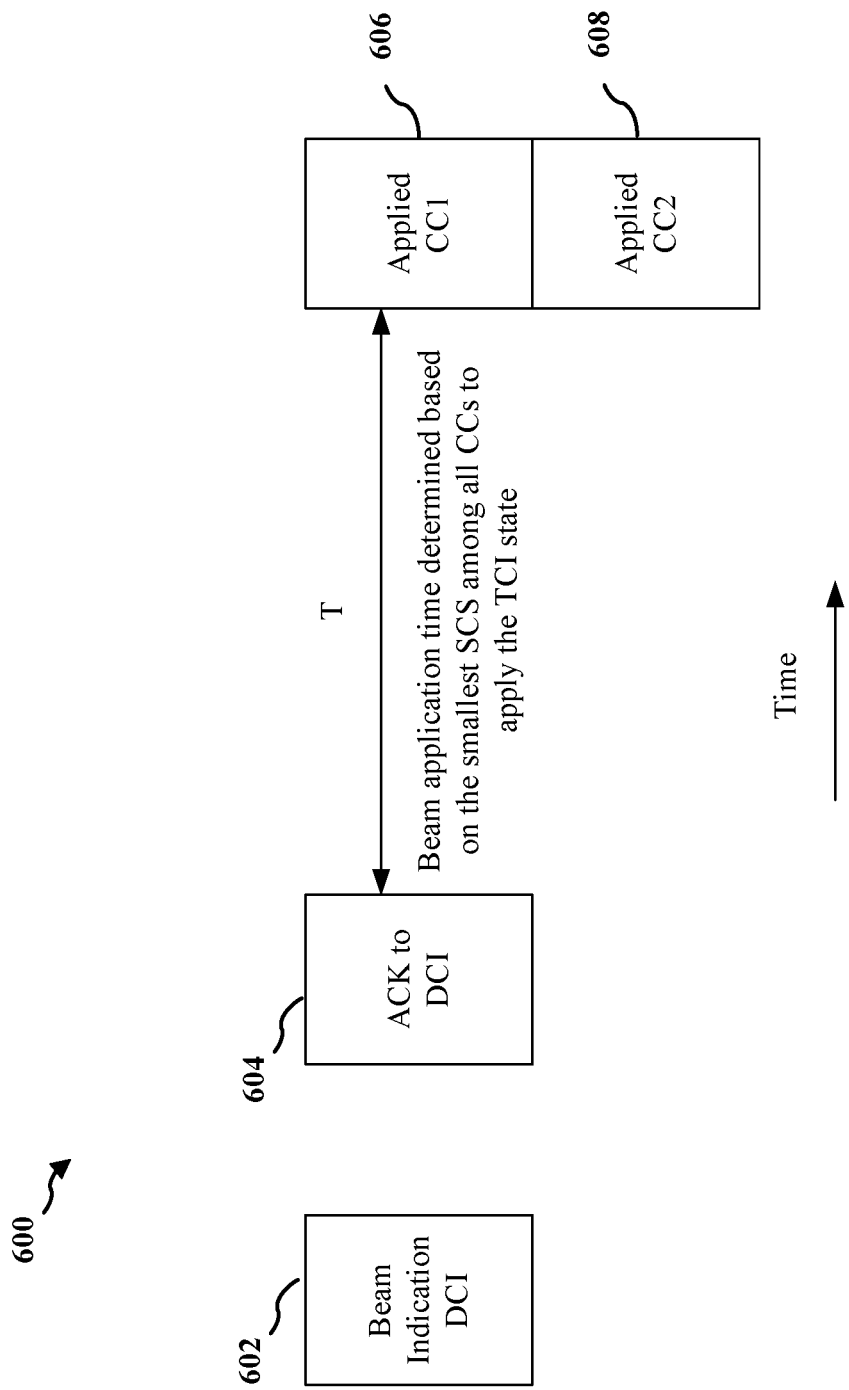
FIG. 6 is a diagram illustrating example beam application time for multiple component carriers.

For DCI-based beam indication, the UE applies the new TCI state in the first slot that is at least X ms (or Y symbols) after the last symbol of the acknowledgment of the joint or separate DL/UL beam indication, X and Y corresponding to a positive integer value. The UE sends an acknowledgment (ACK) to the received beam indication DCI, which may be a dedicated ACK if the DCI has no DL assignment or an ACK to scheduled PDSCH. The X ms (or Y symbols) may be based on the UE capability. When a common TCI state is applied among multiple component carriers (CCs), the X ms (or Y symbols) may be determined based on one of the multiple CCs, such as the CC with the smallest SCS. FIG. 6 is a diagram 600 illustrating an example beam application time for multiple CCs. In the example shown in FIG. 6, the beam indication is sent via a beam indication DCI 602, and the indicated TCI state is applied on two CCs (CC1, CC2). The beam application time (T) for application of the new TCI state to these two CCs (i.e., the time from the ACK 604 that the UE transmits in response to reception of the beam indication DCI (ACK to DCI) (Applied CC1 606 and Applied CC2 608)) is determined based on the smallest SCS among CC1 and CC2. The TCI state may be indicated from an activated set of TCI states configured for the UE. For example, prior to receiving the DCI 602, the UE may receive an RRC configuration that configures multiple TCI states that may be used with the UE. Then, the UE may receive signaling, such as in a MAC-CE, that activates a subset of the configured TCI states. The network may then indicate one of the activated TCI states to the UE in the DCI 602 for the UE to use in exchanging communication with the network. The activated TCI states, e.g., from which a DCI may indicate a particular TCI state, may be updated by a second MAC-CE.

Aspects of the present disclosure enable the application of a unified TCI framework to mTRP scenarios, which include the scenarios that involve a single DCI (sDCI) and mTRP and scenarios that involve mDCI and mTRP.

In some aspects, the united TCI framework may be applied to mTRP-mDCI case is by extending a single TRP rule to each TRP of the multiple TRPs without cross-TRP indications. A cross-TRP indication refers to an indication of a TCI change to be applied at one TRP that is transmitted in control signaling to a UE from a different TRP. In one example, assuming there are M TRPs in total, up to M indicated TCI states may be allowed at a time, and at most one indicated TCI state may be allowed per TRP. In the single TRP approach, the DCI from each TRP (which may be associated with a particular CORESET pool, e.g., identified by a parameter such as "CORESETpool") may indicate the TCI associated with the same TRP. The TCI application time may be based on a period of time following the ACK to the beam indication DCI, such as described in connection with FIG. 6. In other aspects, as presented herein, cross-TRP indication of TCI states may be provided (to allow DCI from the first TRP to indicate a beam for the second TRP.

Cross-TRP beam indication DCI may improve wireless communication in various aspects. For example, an indicated beam of a first TRP may have low Reference Signal Received Power (RSRP), and the DCI from this TRP may not be reliable. Under a unified TCI state rule, the PDSCH/PDCCH from this TRP are from the same indicated TCI. In this example in which the beam experiences a low RSRP, it may be more reliable to send the TCI information for the first TRP in DCI from a second TRP, e.g., which may have a beam with a better RSRP for the UE. The cross-TRP beam indication may also provide more flexibility at the base station and lower the latency or overhead. For example, if the network wants to schedule data on a first TRP and change a beam at a second TRP at the same time, the base station can send a single DCI in the first TRP to indicate both messages when the cross-TRP indication is allowed, which reduces overhead in comparison to sending separate DCI at the two TRPs. Additionally, if the CORESETs for a first TRP will not occur until after a CORESET for the second TRP, the network may reduce latency by using the earlier PDCCH opportunity from the second TRP to indicate the beam change in the first TRP. Hence, the cross-TRP beam indication DCI may improve the flexibility for base station scheduling, lower the overhead, and reduce latency, which may improve the reliability of wireless communication when a beam with a TRP experiences a reduction in quality.

In an mDCI-mTRP case, a DCI transmitted in a CORESET resource can indicate a TCI update associated with a different CORESETpool parameter. For example, a first TRP may be associated with a first CORESET pool, and a second TRP may be associated with a second CORESET pool. The DCI may be transmitted by the first TRP in a CORESET from the first CORESET pool, and may indicate a TCI that is applicable for the second CORESET pool (e.g., and the second TRP that is associated with the second CORESET pool). The UE may then use the indicated TCI state to monitor for PDCCH from the network in the resources of the second CORESET pool, e.g., and from the second TRP. The DCI may or may not indicate a TCI update from the same TRP at the same time, and the DCI may or may not schedule a PDSCH at the same time.

The TCI state update may be performed in various ways to enable the unified TCI framework for mDCI-based mTRP. In one configuration, a same TCI state update scheme for sDCI may be used for mTRP. In a second configuration, a TCI field in the DCI format 1_1 or DCI format 1_2 (with or without a DL assignment for the UE) associated with one of CORESETPoolIndex values may be used to indicate joint/DL/UL TCI state(s) corresponding to the same CORESET-PoolIndex value. In a third configuration, the TCI field in a DCI format 1_1 of DCI format 1_2 (with or without a DL assignment for the UE) may be used to indicate all joint/DL/UL TCI states corresponding to both CORESETPoolIndex values. In a fourth configuration, the TCI field in the DCI format 1_1 or DCI format 12 (with or without a DL assignment for the UE) associated with one of CORESET-PoolIndex values may be used to indicate joint/DL/UL TCI state(s) corresponding to the same or different CORESET-PoolIndex value. The indicated joint/DL/UL TCI state(s) may apply to the channels/signals associated with the same CORESETPoolIndex value or a different CORESETPoolIndex value may be indicated by the DCI.

Figure 7:
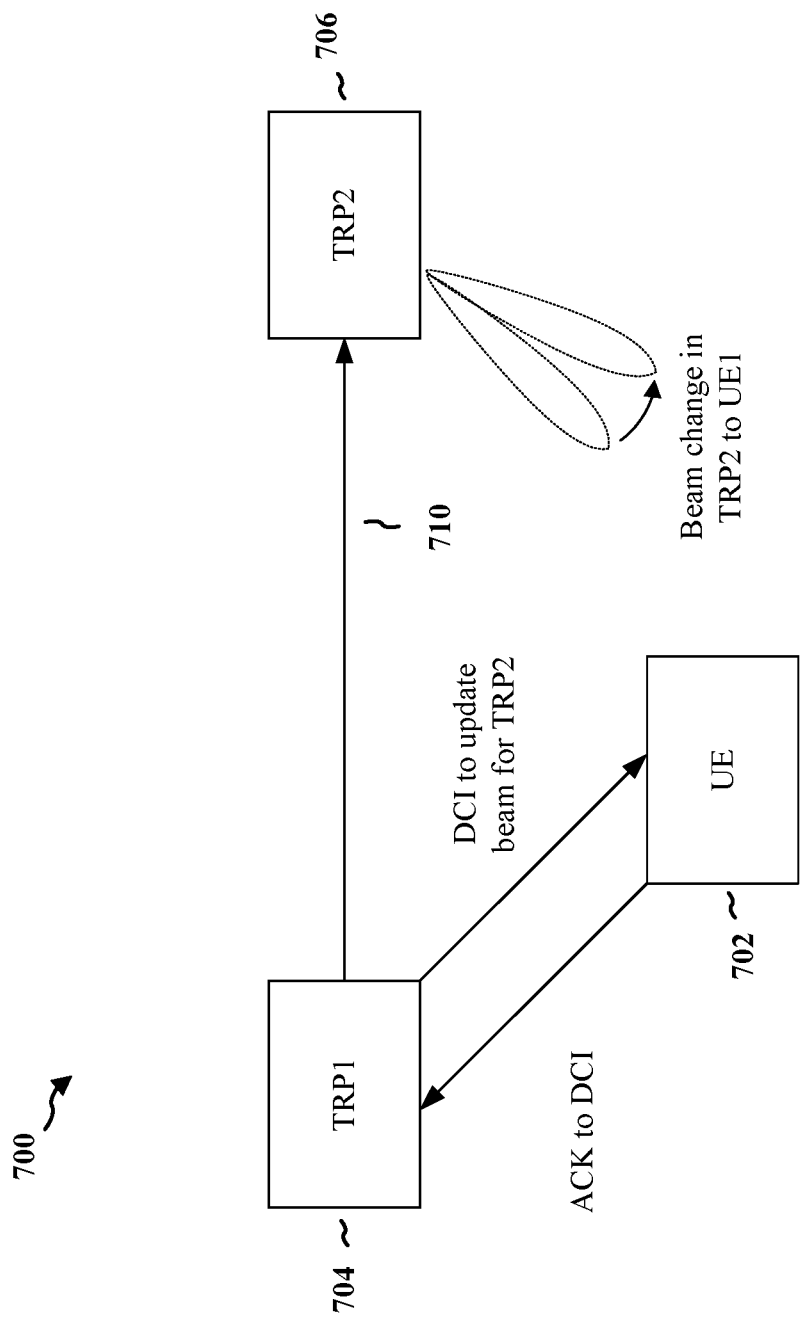
FIG. 7 is a diagram illustrating a beam change with two TRPs in accordance with various aspects of the present disclosure.

For the cross-TRP beam indication, a base station performs the beam change, e.g., and transmits communication to the UE using the indicated TCI state, after the base station receives an ACK from the UE for the beam indication, e.g., following a beam application time after receiving the ACK. FIG. 7 is a diagram 700 illustrating the beam change based on a cross-TRP beam indication in accordance with various aspects of the present disclosure. As shown in FIG. 7, when the backhaul 710 between two TRPs (e.g., TRP1 704 and TRP2 706) is non-ideal (e.g., has a latency of more than a threshold amount), it may take a longer time for TRP1 704 to send the ACK (which TRP1 704 receives from UE 702) to TRP2 706. As the TRP2 706 applies the beam update for communication with the UE 702 after receiving the ACK from the UE, a longer application time may be used in cross-TRP beam indication cases, when the UE sends the ACK to a TRP that is different from the TRP to apply the beam switch.

In some aspects, the ACK/NAK (A/N) may be handled in one of different modes. In mDCI-mTRP cases, the A/N bits for different TRPs may be configured to report in a "joint" or "separate" mode. For example, when two TRPs are connected with a non-ideal backhaul connection, the "separate" mode may be enabled, which allows each TRP to handle its own HARQ process without further delay of forwarding ACK to the other TRP. Similar considerations may be applicable for the A/N for TCI update DCI. For example, when the A/N report is configured in the "joint" mode, to the UE may send an ACK to the TRP from which the DCI was received and may not send an ACK to the TRP that applies the beam update because the backhaul connection is delay-free, e.g., has a delay below a threshold amount of time. When the A/N report is configured in the "separate" mode, the UE may send an ACK to a TRP for information in the DCI is to be applied. The separate ACKs to the TRPs may allow the TRP with which the information in the DCI is to be applied to receive the ACK without a delay (e.g., a backhaul delay when two TRPs have a non-ideal backhaul connection), that may lead to the ACK to the first TRP's DCI about the second TRP's beam update not being forwarded to the second TRP on time.

The present disclosure presents several solutions to address the issue related to the cross-TRP beam indication with a possible backhaul connection delay.

In one aspect, the base station may use a single beam application time for cross-TRP beam indications and same TRP (e.g., non-cross-TRP) beam indications. The base station may use a single beam application time for cross-TRP beam indications with different delays in backhaul connections between the TRPs and with different reporting modes of the UE. As an example, the base station may configure a longer beam application time (BAT) for all beam indications, such that the longer BAT is sufficient for both same-TRP and cross-TRP indications by providing for a possible delay in the backhaul between TRPs. The longer BAT may add latency for beam switches in same TRP scenarios, for cross-TRP scenarios with low backhaul delay, and for separate feedback modes in which the UE provides the ACK to the TRP with which the TCI state is to be applied.

In another aspect, the base station may use a single BAT may be configured for both same-TRP and cross-TRP TCI indications, and may determine whether to configure cross-TRP indications (e.g., in which the TRP to apply the new TCI state is different than the TRP that sends the DCI indicating the TCI state) or both TRP TCI indications based on the backhaul between TRPs. For example, when the backhaul connections between TRPs are ideal, the base station may enable cross-TRP TCI indication via RRC or MAC-CE. When a joint A/N report across TRP is selected, cross-TRP beam indication may be enabled.

In some aspects, the base station may configure different BATs for different types of TCI indications, e.g., different BATs for two or more of cross-TRP TCI indications (DCI is sent from one TRP indicating a new TCI state for a different TRP), same TRP TCI indications (DCI from a TRP indicates a new TCI state for the TRP), and both TRP TCI indications (DCI from both TRPs indicate new TCI states for the TRPs). For example, the network may configure multiple BAT values (e.g., $X_1$, $X_2$, and $X_3$) in an RRC configuration for the UE. $X_1$ may correspond to a BAT for a same-TRP TCI indication. $X_2$, may correspond to a BAT for a cross-TRP TCI indication, and $X_3$ may correspond to a both-TRP beam TCI indications. For example, when the backhaul connection is ideal, or when A/N is configured in a joint feedback mode, the base station may configure $X_1=X_2=X_3 \geq Y$, where Y is based on a UE-reported capability of minimum beam switching time. For example, when the backhaul connection is non-ideal, or when A/N is configured in a separate feedback mode, the base station may configure $X_3=X_2=X_1+d$, where d addresses the extra delay due to non-ideal backhaul. In this aspect, the term "same TRP" means the TRP that sends the DCI and the TRP to apply the beam are the same TRP, and the term "cross TRP" means the TRP that sends the DCI and the TRP to apply the beam indication are different TRPs.

In some aspects, the BAT $X_1$ may be the application time when the TRP receiving the ACK is the same as the TRP that applies the beam switching (e.g., which may be referred to as same TRP feedback). The BAT $X_2$ may be the application time when the TRP receiving the ACK is different from at least one of the TRPs that apply the beam switching (e.g., which may be referred to as cross-TRP feedback). $X_2$ may be applied to the case of a DCI triggering two TRPs' beam switch, to cross-beam indication when separate A/N is enabled, or to same-beam indication of the first TRP, when A/N is configured to the second TRP. In this aspect, the term "same TRP" means the TRP that receives the ACK and the TRP to apply the indicated beams are the same TRP, and the term "cross TRP" means the TRP to apply the beam and the TRP to receive the ACK are different TRPs.

Figure 8:
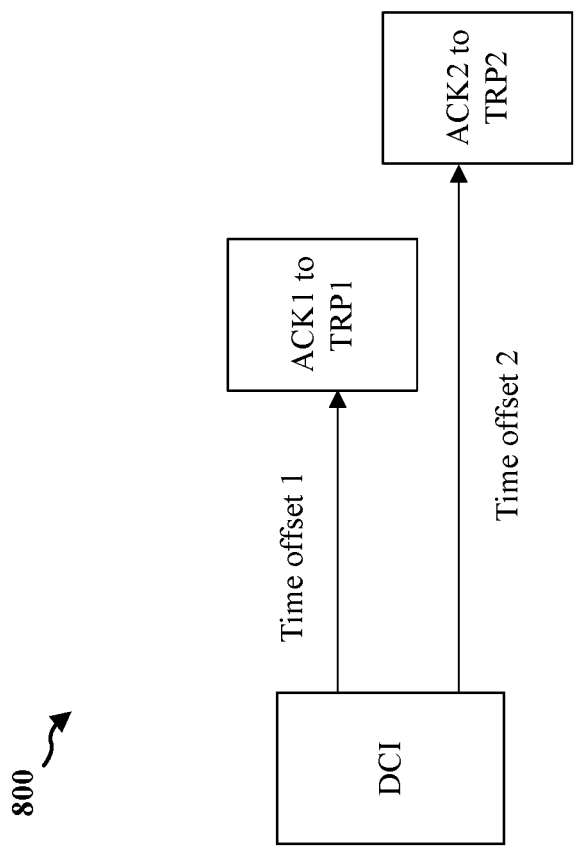
FIG. 8 is a diagram illustrating a UE transmitting multiple acknowledgements (ACKs) in accordance with various aspects of the present disclosure.

In the some aspects, additional A/N for cross-TRP TCI indication DCI, may be configured for the UE to send to the TRP that applies the TCI update. In some cases, a UE may send two A/Ns for a DCI. For example, the UE may receive a DCI from the first TRP, and the DCI may schedule a PDSCH from the first TRP and indicate a TCI update in the second TRP. In that case, the UE may send two A/Ns for the DCI: the first A/N for the scheduled PDSCH of the first TRP and the second A/N for the TCI update of the second TRP. As the time offset for sending A/N is indicated in DCI, when the UE sends two A/Ns for a DCI, two time offsets may be indicated for the two A/Ns. FIG. 8 is a diagram 800 illustrating a UE transmitting multiple ACKs in accordance with various aspects of the present disclosure. As shown in FIG. 8, after the DCI, the UE may send the first ACK (ACK1) to the first TRP (TRP1), and send the second ACK (ACK2) to the second TRP (TRP2). The UE may send the first ACK (ACK1) after the first time offset (Time offset 1), and send the second ACK (ACK2) after the second time offset (Time offset 2).

In one configuration, the two time offsets may be indicated in two DCI fields (i.e., one new field is added for the second ACK). In another configuration, a single index in a single DCI field may be used to indicate the time offsets. In that case, a table where each row has two time offset values may be defined, and the single DCI field may indicate the index of the row 1D. Table 2 is an example table for this configuration. Each row of Table 2 may include two time offsets (e.g., Time offset 1 and Time offset 2) and a row ID identifying the row. The single DCI field may indicate a row ID (e.g., row ID 0) identifying a row in the table, and the two time offsets in the identified row (e.g., $T_1$ and $T_2$) may be used. When multiple ACKs are sent, the start of the beam application time may be decided based on the ACK received by the TRP that applies the beam switch, and a single BAT is needed.

TABLE 2 predefined table for time offsets

| Row ID | Time offset 1 | Time offset 2 |
|---|---|---|
| 0 | $T_1$ | $T_2$ |
| 2 | $T_3$ | $T_4$ |

Figure 9:
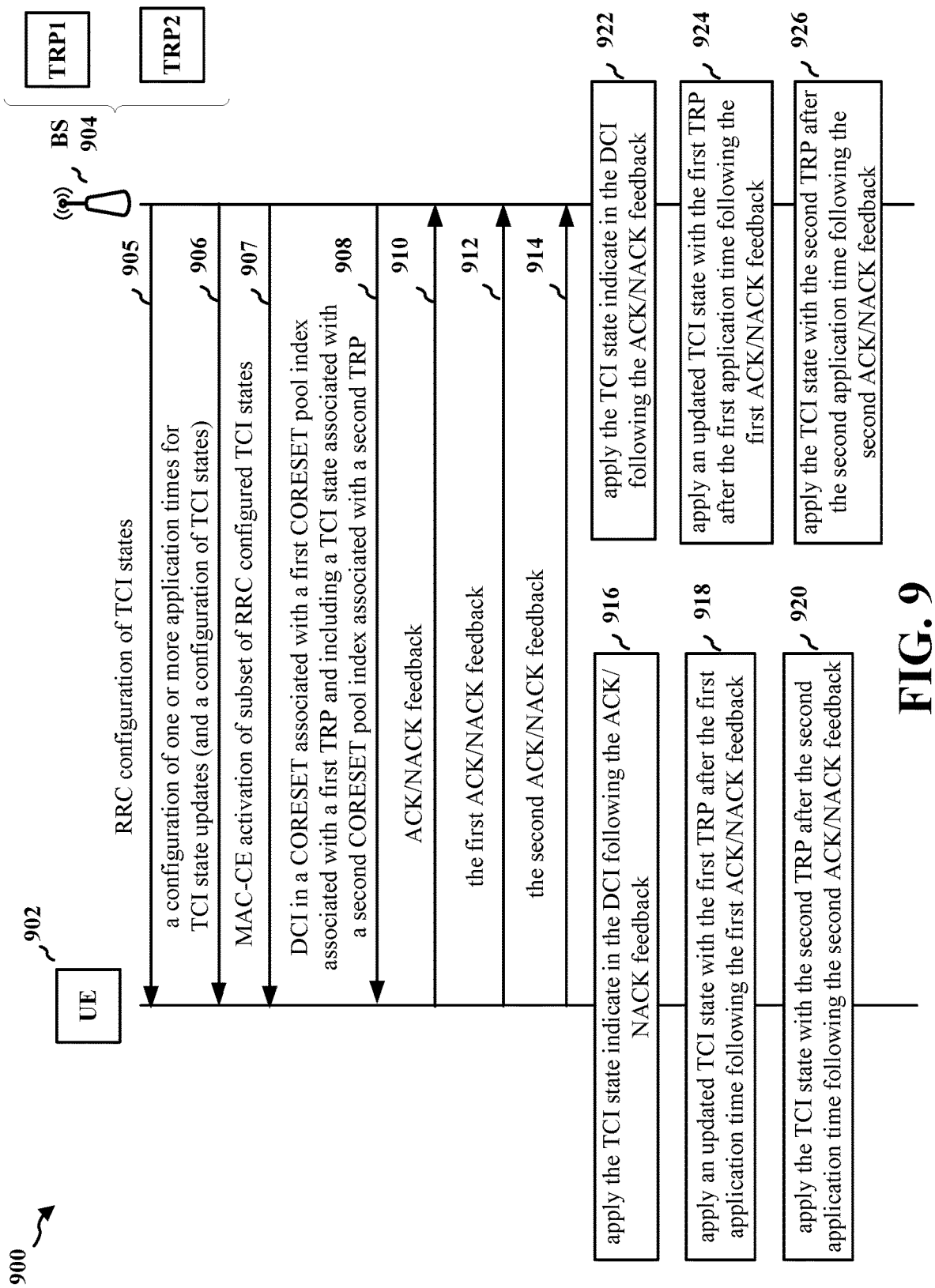
FIG. 9 is a call flow diagram illustrating a method of wireless communication in accordance with various aspects of the present disclosure.

FIG. 9 is a call flow diagram 900 illustrating a method of wireless communication in accordance with various aspects of this present disclosure. Although aspects are described for a base station 904, the aspects may be performed by a base station in aggregation and/or by one or more components of a base station 904 (e.g., such as a CU 110, a DU 130, and/or an RU 140). As shown in FIG. 9, a UE 902 may, at 906, receive from a base station 904 a configuration of multiple application time values for TCI state updates. As illustrated, the base station 904 may be associated with or comprise multiple TRPs. The multiple TRPs may include aspects described in connection with FIGS. 5B, 5C, and 7.

At 908, the UE 902 may further receive DCI in a CORESET associated with a first CORESET pool index. The first CORESET pool index may be associated with a first TRP. The DCI may further include a TCI state associated with a second CORESET pool index associated with a second TRP. For example, the DCI from TRP1 may indicate a TCI state for communication between the UE and the TRP2 in FIG. 9.

At 910, the UE 902 may transmit ACK/NACK feedback to one or more TRPs based on a feedback mode configured for the UE.

In some aspects, at 912, the UE 902 may transmit a first ACK/NACK feedback to the first TRP. At 914, the UE 902 may transmit a second ACK/NACK feedback to the second TRP. FIGS. 6-8 illustrate various aspects of ACK/NACK feedback for TCI state indications.

At 916, the UE 902 may apply the TCI state indicated in the DCI following the ACK/NACK feedback based on one of the multiple application time values. The application time may be based on the indication mode, and/or the feedback mode (e.g., joint or separate). The application time may include any of the aspects described in the present application. FIGS. 6, 7, and 8, illustrate various aspects in connection with application times for beam changes among multiple TRPs.

In some aspects, the UE may apply TCI state updates using different BATs for the different TRPs. For example, at 918, the UE 902 may apply an updated TCI state with the first TRP after a first application time following the first ACK/NACK feedback. At 920, the UE 902 may apply the TCI state with the second TRP after a second application time following the second ACK/NACK feedback. FIG. 8 illustrates an example of different application times.

At 922, the base station 904 may apply the TCI state indicated in the DCI following the ACK/NACK feedback based on one of the multiple application time values and the feedback mode.

In some aspects, at 924, the base station 904 may apply an updated TCI state with the first TRP after a first application time following the first ACK/NACK feedback. At 926, the base station 904 may apply the TCI state with the second TRP after a second application time following the second ACK/NACK feedback.

FIG. 9 illustrates that the UE may receive an RRC configuration of multiple TCI states, at 905. Then, at 907, the UE may receive a MAC-CE that activates a set of TCI states from the RRC configured TCI states. The DCI, at 908, may indicate a TCI state from the set of activated TCI states.

Figure 10:
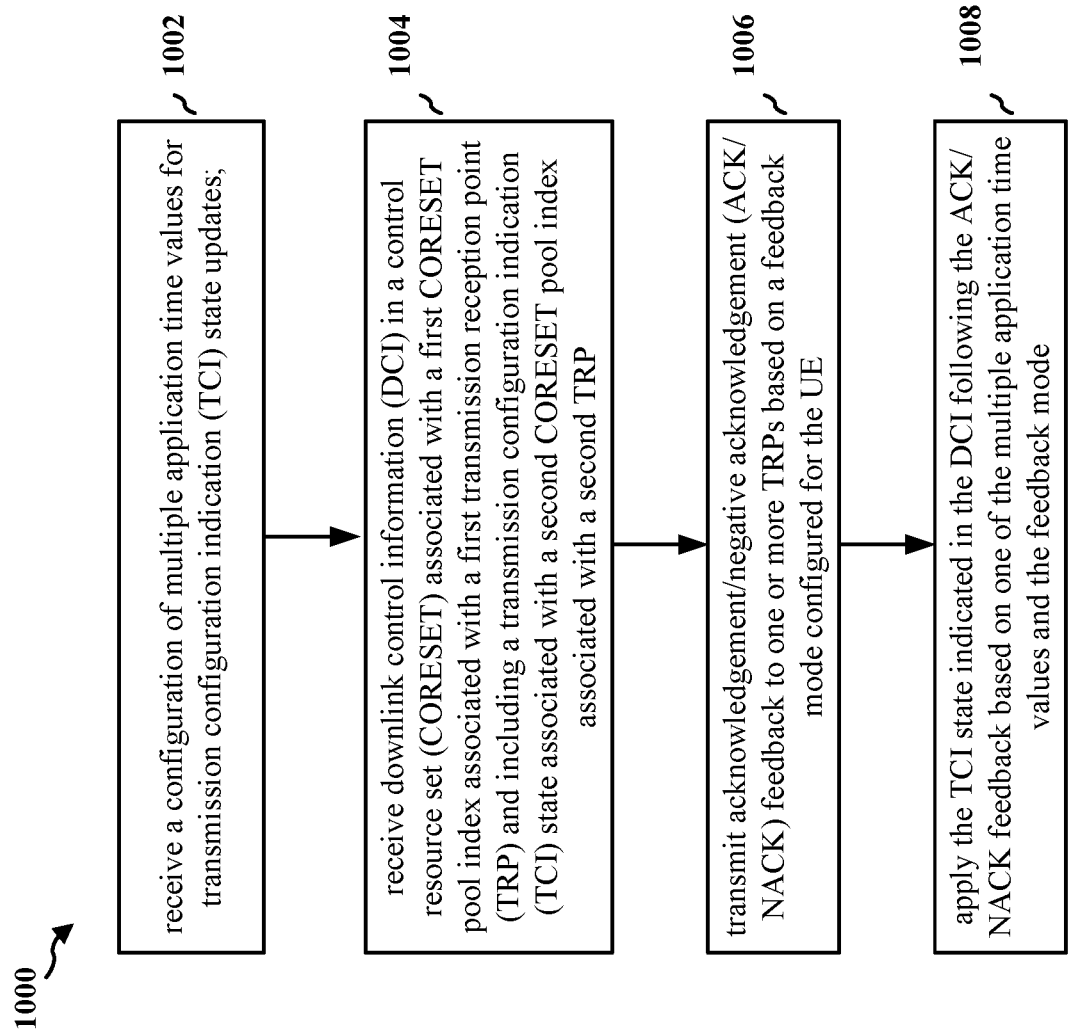
FIG. 10 is the first flowchart illustrating methods of wireless communication at a UE in accordance with various aspects of the present disclosure.

FIG. 10 is a flowchart 1000 illustrating methods of wireless communication at a UE in accordance with various aspects of the present disclosure. The method may be performed by a UE. The UE may be the UE 104, 350, 902, or the apparatus 1504 in the hardware implementation of FIG. 15. The method enables cross-TRP beam indication DCI, which improves the flexibility for base station scheduling, lower the overhead and latency, and improve the reliability of wireless communication.

As shown in FIG. 10, at 1002, the UE may receive a configuration of multiple application time values for TCI state updates from a network entity. The network entity may be a base station, or a component of a base station, in the access network of FIG. 1 or a core network component (e.g., base station 102, 310; base station 904; or the network entity 1502 in the hardware implementation of FIG. 15). FIGS. 7, 8 and 9 illustrate various aspects of the steps in connection with flowchart 1000. For example, referring to FIG. 9, the UE 902 may, at 906, receive a configuration of multiple application time values for TCI state updates from a network entity (base station 904).

At 1004, the UE may receive DCI in a CORESET associated with a first CORESET pool index associated with a first TRP and including a TCI state associated with a second CORESET pool index associated with a second TRP. For example, referring to FIG. 9, at 908, the UE 902 may receive, from the network entity (base station 904), DCI in a CORESET. The CORESET may be associated with a first CORESET pool index associated with a first TRP and may include a TCI state associated with a second CORESET pool index associated with a second TRP.

At 1006, the UE may transmit ACK/NACK feedback to one or more TRPs based on a feedback mode configured for the UE. For example, referring to FIG. 9, at 910, the UE 902 may transmit ACK/NACK feedback to one or more TRPs of the network entity (base station 904) based on a feedback mode configured for the UE 902.

At 1008, the UE may apply the TCI state indicated in the DCI following the ACK/NACK feedback based on one of the multiple application time values and the feedback mode. For example, referring to FIG. 9, the UE 902 may, at 916, apply the TCI state indicated in the DCI following the ACK/NACK feedback based on one of the multiple application time values and the feedback mode.

Figure 11:
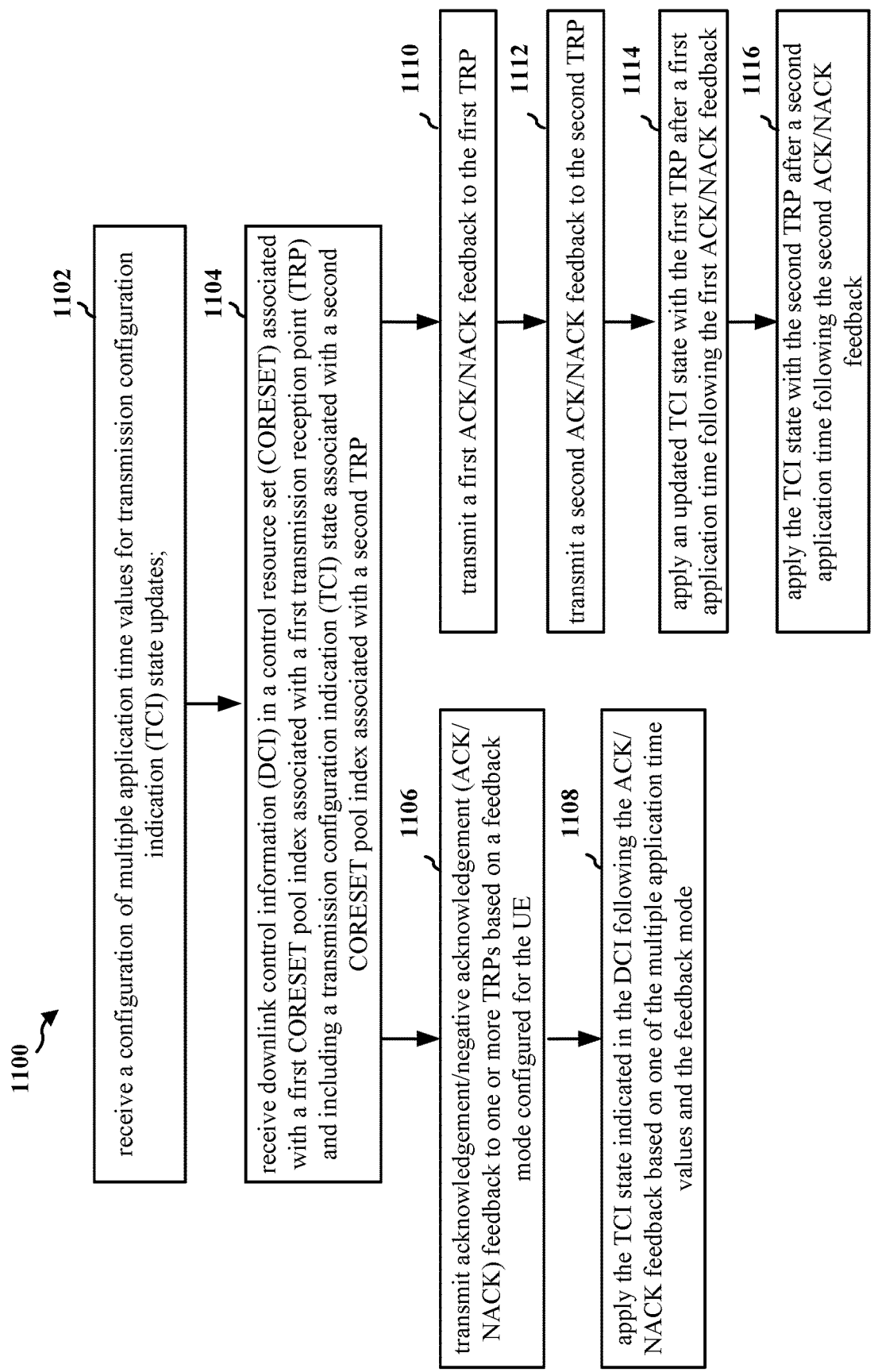
FIG. 11 is the second flowchart illustrating methods of wireless communication at a UE in accordance with various aspects of the present disclosure.

FIG. 11 is a flowchart 1100 illustrating methods of wireless communication at a UE in accordance with various aspects of the present disclosure. The method may be performed by a UE. The UE may be the UE 104, 350, 902, or the apparatus 1504 in the hardware implementation of FIG. 15. The method enables cross-TRP beam indication DCI, which improves the flexibility for base station scheduling, lower the overhead and latency, and improve the reliability of wireless communication.

As shown in FIG. 11, at 1102, the UE may receive a configuration of multiple application time values for TCI state updates from a network entity. The network entity may be a base station, or a component of a base station, in the access network of FIG. 1 or a core network component (e.g., base station 102, 310; base station 904; or the network entity 1502 in the hardware implementation of FIG. 15). FIGS. 7, 8 and 9 illustrate various aspects of the steps in connection with flowchart 1100. For example, referring to FIG. 9, the UE 902 may, at 906, receive a configuration of multiple application time values for TCI state updates from a network entity (base station 904).

At 1104, the UE may receive DCI in a CORESET associated with a first CORESET pool index associated with a first TRP and including a TCI state associated with a second CORESET pool index associated with a second TRP. For example, referring to FIG. 9, at 908, the UE 902 may receive, from the network entity (base station 904), DCI in a CORESET. The CORESET may be associated with a first CORESET pool index associated with a first TRP and may include a TCI state associated with a second CORESET pool index associated with a second TRP.

At 1106, the UE may transmit ACK/NACK feedback to one or more TRPs based on a feedback mode configured for the UE. For example, referring to FIG. 9, at 910, the UE 902 may transmit ACK/NACK feedback to one or more TRPs of the network entity (base station 904) based on a feedback mode configured for the UE 902.

At 1108, the UE may apply the TCI state indicated in the DCI following the ACK/NACK feedback based on one of the multiple application time values and the feedback mode. For example, referring to FIG. 9, the UE 902 may, at 916, apply the TCI state indicated in the DCI following the ACK/NACK feedback based on one of the multiple application time values and the feedback mode.

In some aspects, the feedback mode may include one of: a joint feedback mode in which the UE transmits the ACK/NACK feedback to the first TRP, and a separate feedback mode in which the UE transmits the ACK/NACK feedback to the first TRP from which the DCI is received and the second TRP associated with the TCI state indicated in the DCI. For example, referring to FIG. 7, the feedback mode may be the joint feedback mode. In the joint feedback mode, the UE 702 may transmit the ACK/NACK feedback (ACK to DCI) to the first TRP 704 (from which the DCI is received). The feedback mode may also be the separate feedback mode. In the separate feedback mode, the UE 702 may transmit the ACK/NACK feedback to the first TRP 704 from which the DCI is received and the second TRP 706 associated with the TCI state indicated in the DCI.

In some aspects, the multiple application time values may include a first application time for a first type of TCI state update from the same TRP to which the TCI state update is to be applied. The multiple application time values may further include one or more of: a second application time for a cross-TRP TCI state update associated with at least one of a first backhaul type or a separate feedback mode, a third application time for the cross-TRP TCI state update associated with at least one of a second backhaul type or a joint feedback mode, a fourth application time for a multiple TRP TCI state update associated with at least one of the first backhaul type or the separate feedback mode, or a fifth application time for the multiple TRP TCI state associated with at least one of the second backhaul type or the joint feedback mode. For example, referring to FIG. 9, when the UE 902 receives, at 906, a configuration of multiple application times for TCI state updates. The multiple application time values may include a first application time for a first type of TCI state update from the same TRP to which the update is to be applied. The multiple application time values may further include one or more of: a second application time for a cross-TRP TCI state update associated with at least one of a first backhaul type or a separate feedback mode, a third application time for the cross-TRP TCI state update associated with at least one of a second backhaul type or a joint feedback mode, a fourth application time for a multiple TRP TCI state update associated with at least one of the first backhaul type or the separate feedback mode, or a fifth application time for the multiple TRP TCI state associated with at least one of the second backhaul type or the joint feedback mode.

In some aspects, the first application time may correspond to the second application time and the fourth application time for an ideal backhaul between the first TRP and the second TRP, and the third application time and the fifth application time may correspond to the first application time plus an additional time period for a non-ideal backhaul between the first TRP and the second TRP. For example, referring to FIG. 7, the first application time may correspond to the second application time and the fourth application time for an ideal backhaul between the first TRP 704 and the second TRP 706, and the third application time and the fifth application time may correspond to the first application time plus an additional time period for a non-ideal backhaul (e.g., backhaul 710) between the first TRP 704 and the second TRP 706.

In some aspects, the multiple application time values may include: a first application time for a first type of TCI state update with feedback to the same TRP to which the TCI state update is to be applied, and a second application time for a cross-TRP feedback. For example, referring to FIG. 7, the multiple application time values may include: a first application time for a first type of TCI state update with feedback to the same TRP (e.g., TRP1 704) to which the TCI state update is to be applied, and a second application time for a cross-TRP feedback (e.g., TCI state update for TRP2 706).

In some aspects, the second application time may be associated with one or more of: the DCI triggering a beam switch for multiple TRPs, a separate feedback mode, or feedback to the second TRP for the DCI received from the first TRP. For example, referring to FIG. 7, the second application time may be associated with one or more of: the DCI triggering a beam switch for multiple TRPs (e.g., TRP1 704 and TRP2 706), a separate feedback mode, or feedback to the second TRP (e.g., TRP2 706) for the DCI received from the first TRP (e.g., TRP1 704).

At 1110, the UE may transmit a first ACK/NACK feedback to the first TRP. At 1112, the UE may transmit a second ACK/NACK feedback to the second TRP. For example, referring to FIG. 9, in some aspects, to transmit ACK/NACK feedback, the UE 902 may, at 912, transmit a first ACK/NACK feedback to the first TRP, and, at 914, transmit a second ACK/NACK feedback to the second TRP. Referring to FIG. 8, the UE may transmit a first ACK/NACK feedback (ACK1 to TRP1) to the first TRP, and transmit a second ACK/NACK feedback (ACK1 to TRP2) to the second TRP.

In some aspects, the first ACK/NACK feedback may be transmitted at a first time offset from the DCI, and the second ACK/NACK feedback may be transmitted at a second time offset from the DCI. For example, referring to FIG. 8, the first ACK/NACK feedback (ACK1 to TRP1) may be transmitted at a first time offset (Time offset 1) from the DCI, and the second ACK/NACK feedback (ACK2 to TRP2) may be transmitted at a second time offset (Time offset 2) from the DCI.

In some aspects, the DCI may indicate the first time offset and the second time offset. For example, referring to FIG. 9, the DCI the UE 902 receives at 908 may indicate the first time offset and the second time offset. Referring to FIG. 8, the DCI may indicate the first time offset (Time offset 1) and the second time offset (Time offset 2).

In some aspects, two DCI fields in the DCI may indicate the first time offset and the second time offset. For example, referring to FIG. 9, when the UE 902 receives, at 908, DCI in a CORESET. The DCI may have two DCI fields respectively indicating the first time offset and the second time offset.

In some aspects, a single DCI field in the DCI may indicate the first time offset and the second time offset. For example, referring to FIG. 9, when the UE 902 receives, at 908, DCI in a CORESET. The DCI may have one single DCI field indicating the first time offset and the second time offset. Referring to Table 2, the single DCI field may indicate a row ID (e.g., row ID 0) identifying a row in Table 2, and the corresponding row in Table 2 may identify the first time offset (Time offset 1) and the second time offset (Time offset 2).

At 1114, the UE may apply an updated TCI state with the first TRP after a first application time following the first ACK/NACK feedback. At 1116, the UE may apply the TCI state with the second TRP after a second application time following the second ACK/NACK feedback. For example, referring to FIG. 9, in some aspects, the UE 902 may, at 918, apply an updated TCI state with the first TRP after a first application time following the first ACK/NACK feedback (which is sent at 912). The UE 902 may further apply, at 920, the TCI state with the second TRP after a second application time following the second ACK/NACK feedback (which is sent at 914).

In some aspects, the first application time corresponds to the same length of time as the second application time. For example, referring to FIG. 9, the first application time (at 918) may correspond to the same length of time as the second application time (at 920).

Figure 12:
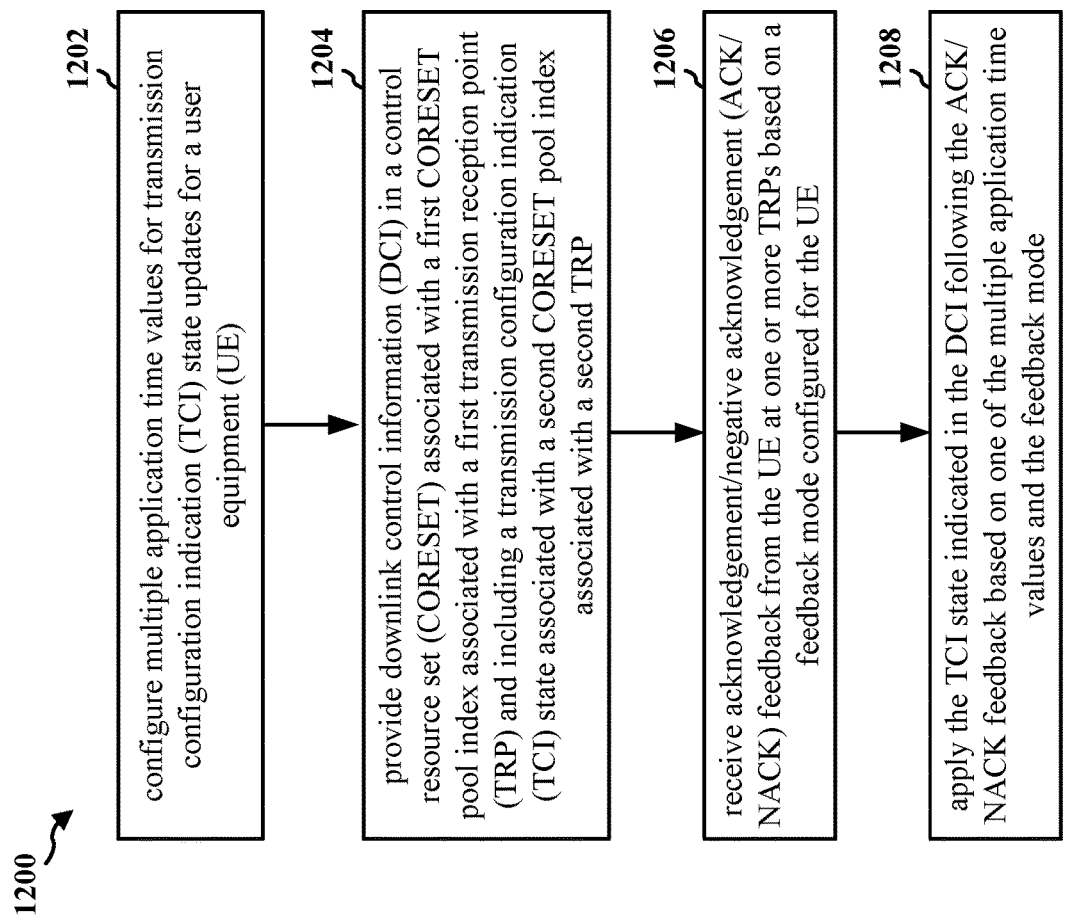
FIG. 12 is the first flowchart illustrating methods of wireless communication at a network entity in accordance with various aspects of the present disclosure.

FIG. 12 is a flowchart 1200 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 904; or the network entity 1502 in the hardware implementation of FIG. 15). The method enables cross-TRP beam indication DCI, which improves the flexibility for base station scheduling, lower the overhead and latency, and improve the reliability of wireless communication.

As shown in FIG. 12, at 1202, the network entity may configure multiple application time values for TCI state updates for a UE. The UE may be the UE 104, 350, 902, or the apparatus 1504 in the hardware implementation of FIG. 15. FIGS. 7, 8, and 9 illustrate various aspects of the steps in connection with flowchart 1200. For example, referring to FIG. 9, the network entity (base station 904) may configure, at 906, multiple application time values for TCI state updates for a UE 902.

At 1204, the network entity may provide DCI in a CORESET associated with a first CORESET pool index associated with a first TRP and including a TCI state associated with a second CORESET pool index associated with a second TRP. For example, referring to FIG. 9, the network entity (base station 904) may provide, at 908, to a UE 902, DCI in a CORESET. The CORESET may be associated with a first CORESET pool index associated with a first TRP and may include a TCI state associated with a second CORESET pool index associated with a second TRP.

At 1206, the network entity may receive ACK/NACK feedback from the UE at one or more TRPs based on a feedback mode configured for the UE. For example, referring to FIG. 9, at 910, the network entity (base station 904) may receive ACK/NACK feedback from the UE 902 at one or more TRPs based on a feedback mode configured for the UE 902.

At 1208, the network entity may apply the TCI state indicated in the DCI following the ACK/NACK feedback based on one of the multiple application time values and the feedback mode. For example, referring to FIG. 9, the network entity (base station 904) may, at 922, apply the TCI state indicated in the DCI following the ACK/NACK feedback based on one of the multiple application time values and the feedback mode.

Figure 13:
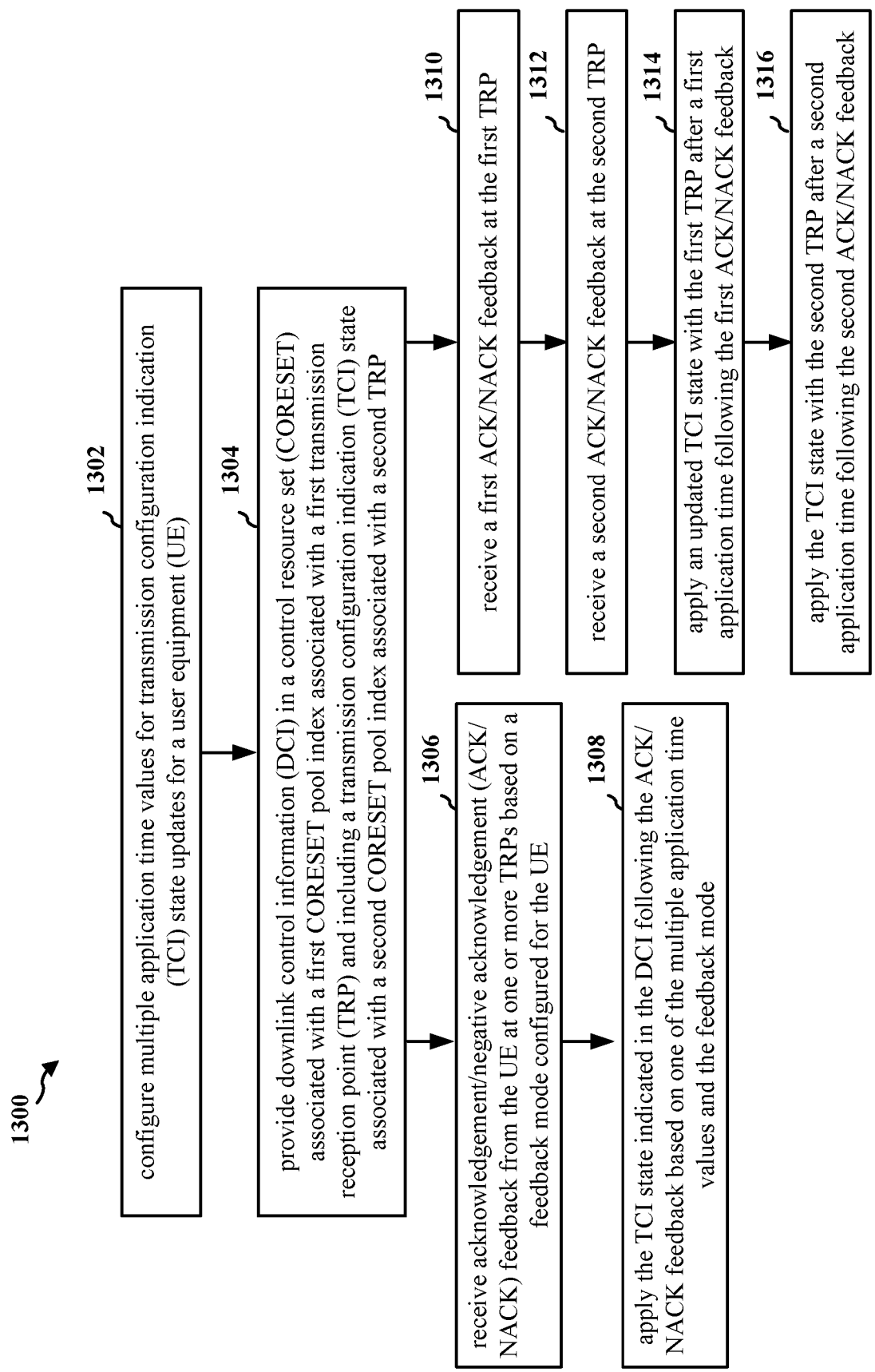
FIG. 13 is the second flowchart illustrating methods of wireless communication at a network entity in accordance with various aspects of the present disclosure.

FIG. 13 is a flowchart 1300 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 904; or the network entity 1502 in the hardware implementation of FIG. 15). The method enables cross-TRP beam indication DCI, which improves the flexibility for base station scheduling, lower the overhead and latency, and improve the reliability of wireless communication.

As shown in FIG. 13, at 1302, the network entity may configure multiple application time values for TCI state updates for a UE. The UE may be the UE 104, 350, 902, or the apparatus 1504 in the hardware implementation of FIG. 15. FIGS. 7, 8, and 9 illustrate various aspects of the steps in connection with flowchart 1300. For example, referring to FIG. 9, the network entity (base station 904) may configure, at 906, multiple application time values for TCI state updates for a UE 902.

At 1304, the network entity may provide DCI in a CORESET associated with a first CORESET pool index associated with a first TRP and including a TCI state associated with a second CORESET pool index associated with a second TRP. For example, referring to FIG. 9, the network entity (base station 904) may provide, at 908, to a UE 902, DCI in a CORESET. The CORESET may be associated with a first CORESET pool index associated with a first TRP and may include a TCI state associated with a second CORESET pool index associated with a second TRP.

At 1306, the network entity may receive ACK/NACK feedback from the UE at one or more TRPs based on a feedback mode configured for the UE. For example, referring to FIG. 9, at 910, the network entity (base station 904) may receive ACK/NACK feedback from the UE 902 at one or more TRPs based on a feedback mode configured for the UE 902.

At 1308, the network entity may apply the TCI state indicated in the DCI following the ACK/NACK feedback based on one of the multiple application time values and the feedback mode. For example, referring to FIG. 9, the network entity (base station 904) may, at 922, apply the TCI state indicated in the DCI following the ACK/NACK feedback based on one of the multiple application time values and the feedback mode.

In some aspects, the feedback mode may include one of: a joint feedback mode in which the UE transmits the ACK/NACK feedback to the first TRP, and a separate feedback mode in which the UE transmits the ACK/NACK feedback to the first TRP from which the DCI is received and the second TRP associated with the TCI state indicated in the DCI. For example, referring to FIG. 7, the feedback mode may be the joint feedback mode. In the joint feedback mode, the UE 702 may transmit the ACK/NACK feedback (ACK to DCI) to the first TRP 704 (from which the DCI is received). The feedback mode may also be the separate feedback mode. In the separate feedback mode, the UE 702 may transmit the ACK/NACK feedback to the first TRP 704 from which the DCI is received and the second TRP 706 associated with the TCI state indicated in the DCI.

In some aspects, the multiple application time values may include a first application time for a first type of TCI state update from the same TRP to which the TCI state update is to be applied. The multiple application time values may further include one or more of: a second application time for a cross-TRP TCI state update associated with at least one of a first backhaul type or a separate feedback mode, a third application time for the cross-TRP TCI state update associated with at least one of a second backhaul type or a joint feedback mode, a fourth application time for a multiple TRP TCI state update associated with at least one of the first backhaul type or the separate feedback mode, or a fifth application time for the multiple TRP TCI state associated with at least one of the second backhaul type or the joint feedback mode. For example, referring to FIG. 9, when the network entity (base station 904) configures, at 906, multiple application times for TCI state updates for the UE 902. The multiple application time values may include a first application time for a first type of TCI state update from the same TRP to which the update is to be applied. The multiple application time values may further include one or more of: a second application time for a cross-TRP TCI state update associated with at least one of a first backhaul type or a separate feedback mode, a third application time for the cross-TRP TCI state update associated with at least one of a second backhaul type or a joint feedback mode, a fourth application time for a multiple TRP TCI state update associated with at least one of the first backhaul type or the separate feedback mode, or a fifth application time for the multiple TRP TCI state associated with at least one of the second backhaul type or the joint feedback mode.

In some aspects, the first application time may correspond to the second application time and the fourth application time for an ideal backhaul between the first TRP and the second TRP, and the third application time and the fifth application time may correspond to the first application time plus an additional time period for a non-ideal backhaul between the first TRP and the second TRP. For example, referring to FIG. 7, the first application time may correspond to the second application time and the fourth application time for an ideal backhaul between the first TRP 704 and the second TRP 706, and the third application time and the fifth application time may correspond to the first application time plus an additional time period for a non-ideal backhaul (e.g., backhaul 710) between the first TRP 704 and the second TRP 706.

In some aspects, the multiple application time values may include: a first application time for a first type of TCI state update with feedback to a same TRP to which the TCI state update is to be applied, and a second application time for a cross-TRP feedback. For example, referring to FIG. 7, the multiple application time values may include: a first application time for a first type of TCI state update with feedback to the same TRP (e.g., TRP1 704) to which the update is to be applied, and a second application time for a cross-TRP feedback (e.g., TCI state update for TRP2 706).

In some aspects, the second application time may be associated with one or more of: the DCI triggering a beam switch for multiple TRPs, a separate feedback mode, or feedback to the second TRP for the DCI received from the first TRP. For example, referring to FIG. 7, the second application time may be associated with one or more of: the DCI triggering a beam switch for multiple TRPs (e.g., TRP1 704 and TRP2 706), a separate feedback mode, or feedback to the second TRP (e.g., TRP2 706) for the DCI received from the first TRP (e.g., TRP1 704).

At 1310, the network entity may receive a first ACK/NACK feedback at the first TRP. At 1312, the network entity may receive a second ACK/NACK feedback at the second TRP. For example, referring to FIG. 9, in some aspects, to receive the ACK/NACK feedback, the network entity (base station 904) may, at 912, receive a first ACK/NACK feedback to the first TRP, and, at 914, receive a second ACK/NACK feedback to the second TRP. Referring to FIG. 8, the network entity may receive a first ACK/NACK feedback (ACK1 to TRP1) at the first TRP, and receive a second ACK/NACK feedback (ACK1 to TRP2) to the second TRP.

In some aspects, the first ACK/NACK feedback may be received at a first time offset from the DCI, and the second ACK/NACK feedback may be received at a second time offset from the DCI. For example, referring to FIG. 8, the first ACK/NACK feedback (ACK1 to TRP1) may be received at a first time offset (Time offset 1) from the DCI, and the second ACK/NACK feedback (ACK2 to TRP2) may be received at a second time offset (Time offset 2) from the DCI.

In some aspects, the DCI may indicate the first time offset and the second time offset. For example, referring to FIG. 9, the DCI the network entity (base station 904) configures at 908 may indicate the first time offset and the second time offset. Referring to FIG. 8, the DCI may indicate the first time offset (Time offset 1) and the second time offset (Time offset 2).

In some aspects, two DCI fields in the DCI may indicate the first time offset and the second time offset. For example, referring to FIG. 9, when the network entity (base station 904) configures, at 908, DCI in a CORESET. The DCI may have two DCI fields respectively indicating the first time offset and the second time offset.

In some aspects, a single DCI field in the DCI may indicate the first time offset and the second time offset. For example, referring to FIG. 9, when the network entity (base station 904) configures, at 908, DCI in a CORESET. The DCI may have one single DCI field indicating the first time offset and the second time offset. Referring to Table 2, the single DCI field may indicate a row ID (e.g., row ID 0) identifying a row in Table 2, and the corresponding row in Table 2 may identify the first time offset (Time offset 1) and the second time offset (Time offset 2).

At 1314, the network entity may apply an updated TCI state with the first TRP after a first application time following the first ACK/NACK feedback. At 1316, the network entity may apply the TCI state with the second TRP after a second application time following the second ACK/NACK feedback. For example, referring to FIG. 9, in some aspects, the network entity (base station 904) may, at 924, apply an updated TCI state with the first TRP after a first application time following the first ACK/NACK feedback (which is received at 912). The network entity (base station 904) may further apply, at 926, the TCI state with the second TRP after a second application time following the second ACK/NACK feedback (which is received at 914).

In some aspects, the first application time corresponds to the same length of time as the second application time. For example, referring to FIG. 9, the first application time (at 924) may correspond to the same length of time as the second application time (at 926).

In some aspects, the DCI may trigger a beam switch for the second TRP, and the start of beam application time for the first TRP and the second TRP may be based on the second ACK/NACK feedback received by the second TRP. For example, referring to FIG. 7, the DCI may trigger a beam switch for the second TRP (TRP2 706), and the start of beam application time for the first TRP (TRP1 704) and the second TRP (TRP2 706) may be based on the second ACK/NACK feedback received by the second TRP (TRP2 706). Referring to FIG. 9, when the network entity (base station 904) configures, at 908, DCI in a CORESET to the UE 902, the DCI may trigger a beam switch for the second TRP, and the start of beam application time for the first TRP and the second TRP may be based on the second ACK/NACK feedback received by the second TRP (at 914).

Figure 14:
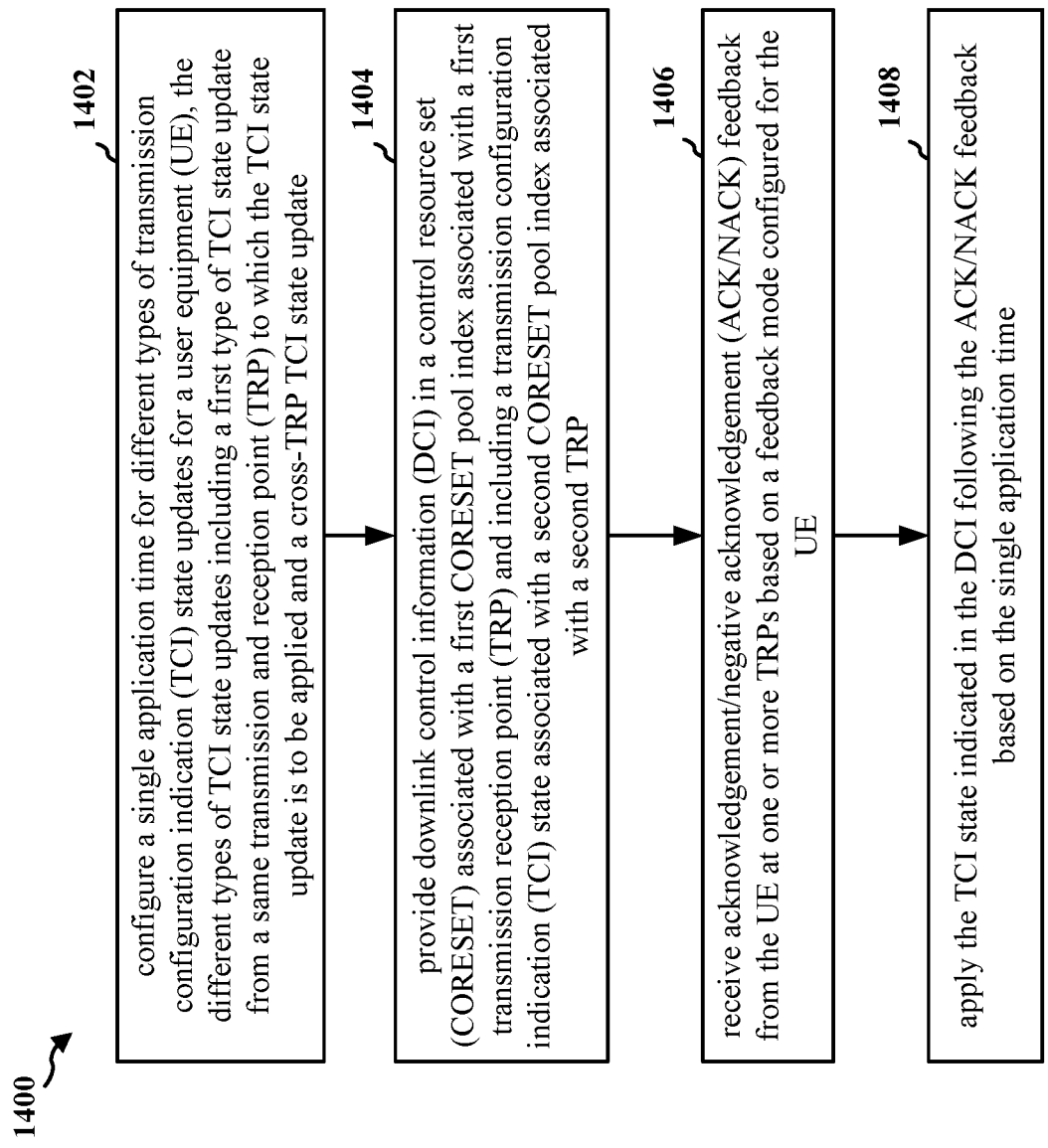
FIG. 14 is the third flowchart illustrating methods of wireless communication at a network entity in accordance with various aspects of the present disclosure.

FIG. 14 is a flowchart 1400 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 904; or the network entity 1502 in the hardware implementation of FIG. 15). The method enables cross-TRP beam indication DCI, which improves the flexibility for base station scheduling, lower the overhead and latency, and improve the reliability of wireless communication.

As shown in FIG. 14, at 1402, the network entity may configure a single application time for different types of TCI state updates for a UE. The different types of TCI state updates may include a first type of TCI state update from the same TRP to which the TCI state update is to be applied and a cross-TRP TCI state update. The UE may be the UE 104, 350, 902, or the apparatus 1504 in the hardware implementation of FIG. 15. FIGS. 7, 8, and 9 illustrate various aspects of the steps in connection with flowchart 1400. For example, referring to FIG. 9, the network entity (base station 904) may configure a single application time for different types of TCI state updates for a UE 902. The different types of TCI state updates may include a first type of TCI state update from the same TRP to which the TCI is to be applied and a cross-TRP TCI state update.

At 1404, the network entity may provide DCI in a CORESET associated with a first CORESET pool index associated with a first TRP and including a TCI state associated with a second CORESET pool index associated with a second TRP. For example, referring to FIG. 9, the network entity (base station 904) may provide, at 908, to a UE 902, DCI in a CORESET. The CORESET may be associated with a first CORESET pool index associated with a first TRP and may include a TCI state associated with a second CORESET pool index associated with a second TRP.

At 1406, the network entity may receive ACK/NACK feedback from the UE at one or more TRPs based on a feedback mode configured for the UE. For example, referring to FIG. 9, at 910, the network entity (base station 904) may receive ACK/NACK feedback from the UE 902 at one or more TRPs based on a feedback mode configured for the UE 902.

At 1408, the network entity may apply the TCI state indicated in the DCI following the ACK/NACK feedback based on the single application time. For example, referring to FIG. 9, the network entity (base station 904) may, at 922, apply the TCI state indicated in the DCI following the ACK/NACK feedback based on the single application time the network entity (base station 904) configures at 906.

In some aspects, the single application time may provide for a delay between TRPs in the cross-TRP TCI state update. Alternatively, the single application time does not provide for a delay between TRPs in the cross-TRP TCI state update, and the cross-TRP TCI state update may be enabled based on one or more of: a backhaul condition between a first TRP and a second TRP associated with the cross-TRP TCI state update, or a feedback mode of the UE. For example, referring to FIG. 9, when the network entity (base station 904) configures, at 906, a single application time for different types of TCI state updates for a UE 902, the single application time may provide for a delay between TRPs in the cross-TRP TCI state update. Alternatively, the single application time does not provide for a delay between TRPs in the cross-TRP TCI state update, and the cross-TRP TCI state update may be enabled based on one or more of: a backhaul condition (e.g., backhaul 710) between a first TRP (e.g., TRP1 704) and a second TRP (e.g., TRP2 706) associated with the cross-TRP TCI state update, or a feedback mode of the UE 902.

Figure 15:
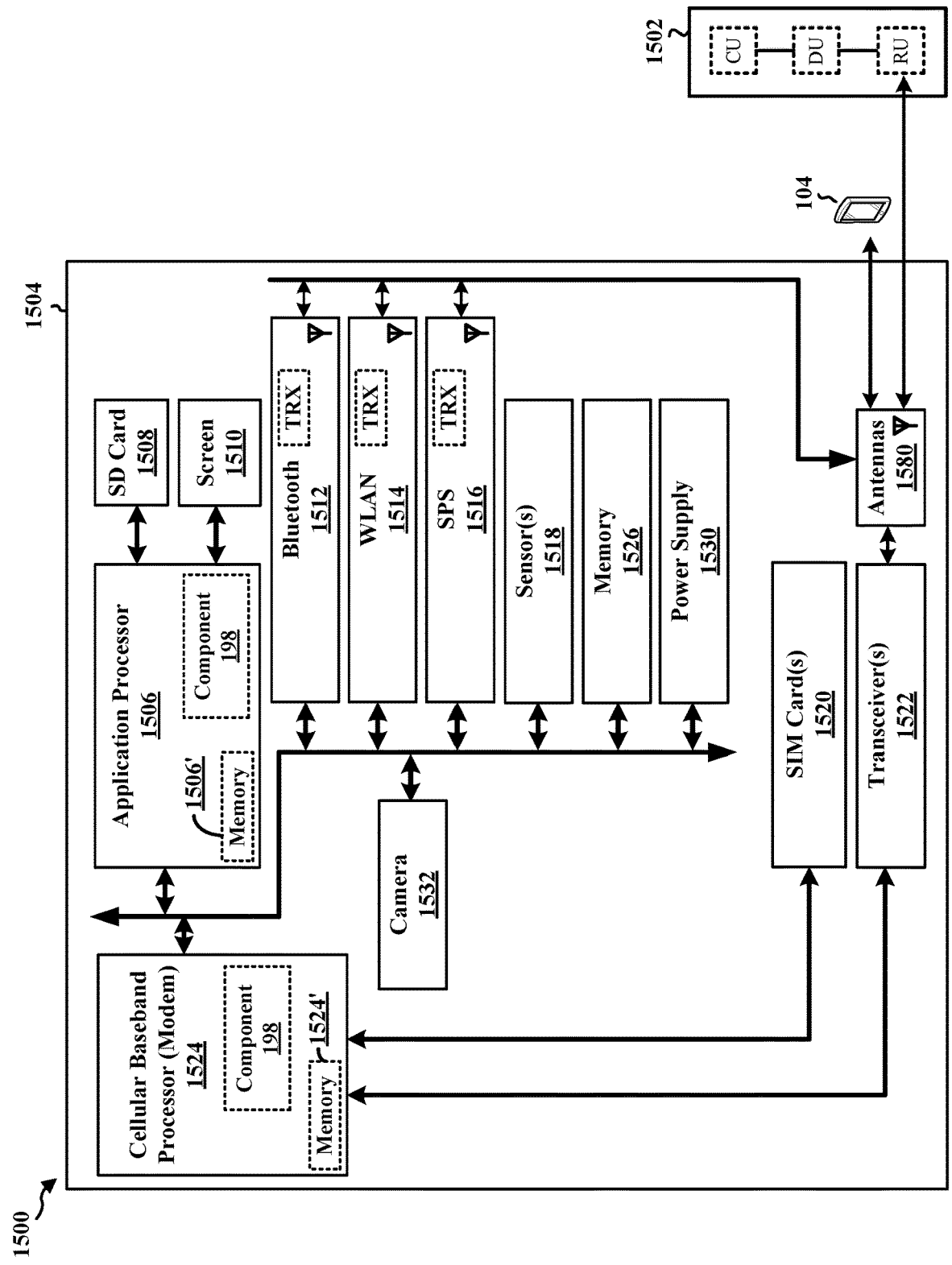
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/ memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see 350 of FIG. 3) and include the additional modules of the apparatus 1504.

As discussed supra, the component 198 is configured to receive a configuration of multiple application time values for TCI state updates; receive DCI in a CORESET associated with a first CORESET pool index associated with a first TRP and including a TCI state associated with a second CORESET pool index associated with a second TRP; transmit ACK/NACK feedback to one or more TRPs based on a feedback mode configured for the UE; and apply the TCI state indicated in the DCI following the ACK/NACK feedback based on one of the multiple application time values and the feedback mode. The component 198 may be further configured to perform any of the aspects described in connection with the flowcharts in FIG. 10 and FIG. 11, and/or performed by the UE 902 in FIG. 9. The component 198 may be within the cellular baseband processor 1524, the application processor 1506, or both the cellular baseband processor 1524 and the application processor 1506. The component 198 may be one or more hardware components specifically configured to carry out the stated processes/ algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for receiving a configuration of multiple application time values for TCI state updates, means for receiving DCI in a CORESET associated with a first CORESET pool index associated with a first TRP and including a TCI state associated with a second CORESET pool index associated with a second TRP, means for transmitting ACK/ NACK feedback to one or more TRPs based on a feedback mode configured for the UE, and means for applying the TCI state indicated in the DCI following the ACK/NACK feedback based on one of the multiple application time values and the feedback mode. The apparatus 1504 may further include means for performing any of the aspects described in connection with the flowcharts in FIG. 10 and FIG. 11, and/or aspects performed by the UE 902 in FIG. 9. The means may be the component 198 of the apparatus 1504 configured to perform the functions recited by the means. As described supra, the apparatus 1504 may include the TX processor 368, the RX processor 356, and the controller/ processor 359. As such, in one configuration, the means may be the TX processor 368, the RX processor 356, and/or the controller/processor 359 configured to perform the functions recited by the means.

Figure 16:
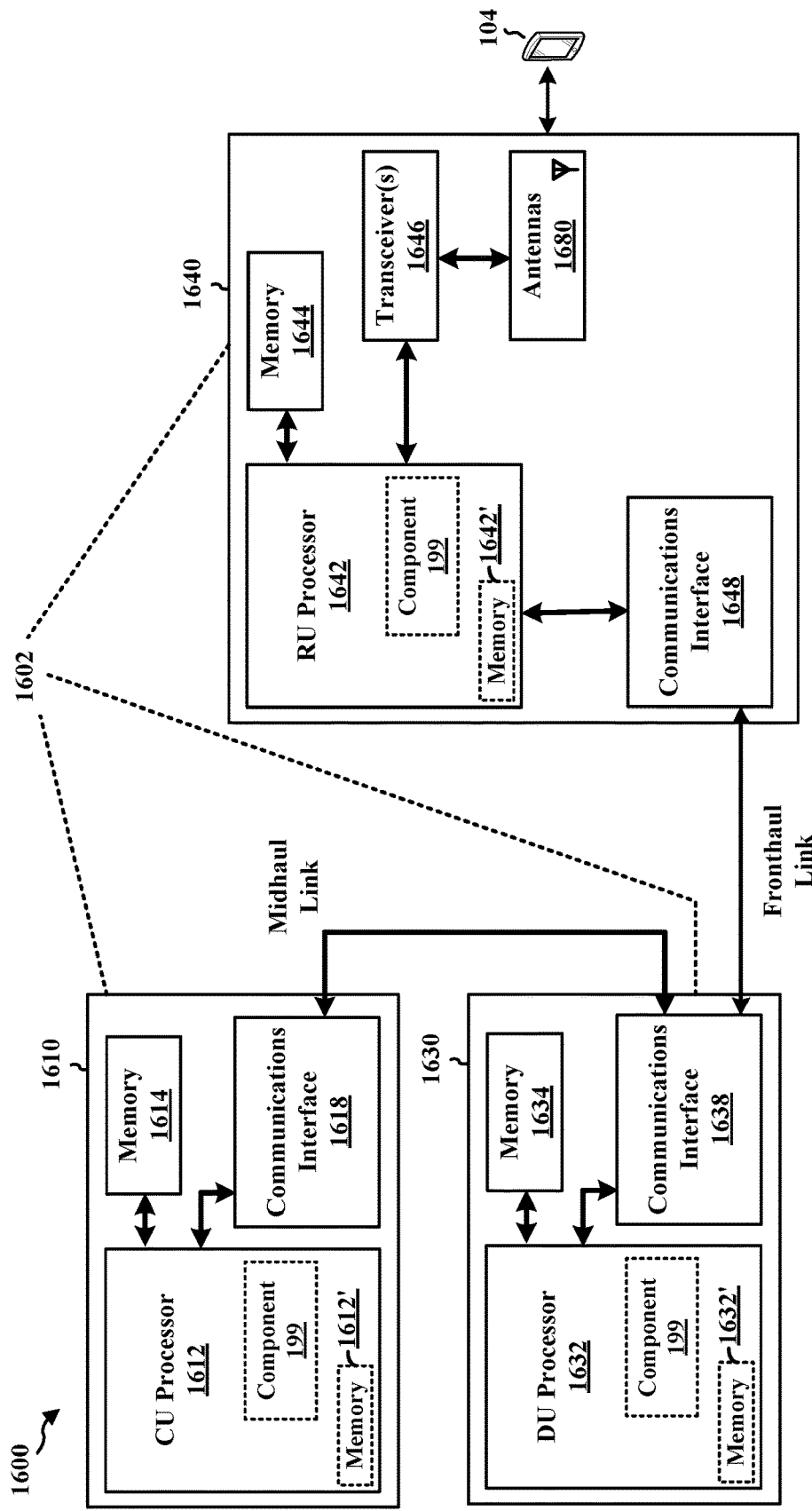
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to configure multiple application time values for TCI state updates for a UE; provide DCI in a CORESET associated with a first CORESET pool index associated with a first TRP and including a TCI state associated with a second CORESET pool index associated with a second TRP; receive ACK/NACK feedback from the UE at one or more TRPs based on a feedback mode configured for the UE; and apply the TCI state indicated in the DCI following the ACK/NACK feedback based on one of the multiple application time values and the feedback mode. The component 199 may be further configured to configure a single application time for different types of TCI state updates for a UE, the different types of TCI state updates including a first type of TCI state update from a same TRP to which the TCI is to be applied and a cross-TRP TCI state update; provide DCI in a CORESET associated with a first CORESET pool index associated with a first TRP and including a TCI state associated with a second CORESET pool index associated with a second TRP; receive ACK/NACK feedback from the UE at one or more TRPs based on a feedback mode configured for the UE; and apply the TCI state indicated in the DCI following the ACK/NACK feedback based on the single application time. The component 199 may be further configured to perform any of the aspects described in connection with the flowcharts in FIG. 12, FIG. 13, FIG. 14, and/or performed by the base station 904 in FIG. 9. The component 199 may be within one or more processors of one or more of the CU 1610, DU 1630, and the RU 1640. The component 199 may be one or more hardware components specifically configured to carry out the stated processes/ algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for configuring multiple application time values for TCI state updates for a UE, means for providing DCI in a CORESET associated with a first CORESET pool index associated with a first TRP and including a TCI state associated with a second CORESET pool index associated with a second TRP, means for receiving ACK/NACK feedback from the UE at one or more TRPs based on a feedback mode configured for the UE, and means for applying the TCI state indicated in the DCI following the ACK/NACK feedback based on one of the multiple application time values and the feedback mode. The network entity 1602 may further include means for configuring a single application time for different types of TCI state updates for a UE, the different types of TCI state updates including a first type of TCI state update from a same TRP to which the TCI is to be applied and a cross-TRP TCI state update, means for providing DCI in a CORESET associated with a first CORESET pool index associated with a first TRP and including a TCI state associated with a second CORESET pool index associated with a second TRP, means for receiving ACK/NACK feedback from the UE at one or more TRPs based on a feedback mode configured for the UE, and means for applying the TCI state indicated in the DCI following the ACK/NACK feedback based on the single application time. The network entity 1602 may further include means for performing any of the aspects described in connection with the flowcharts in FIG. 12, FIG. 13, FIG. 14 and/or aspects performed by the base station 904 in FIG. 9. The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include receiving a configuration of multiple application time values for TCI state updates; receiving DCI in a CORESET associated with a first CORESET pool index associated with a first TRP and including a TCI state associated with a second CORESET pool index associated with a second TRP; transmitting ACK/NACK feedback to one or more TRPs based on a feedback mode configured for the UE; and applying the TCI state indicated in the DCI following the ACK/NACK feedback based on one of the multiple application time values and the feedback mode. The method enables cross-TRP beam indication DCI, which improves the flexibility for base station scheduling, lower the overhead and latency, and improve the reliability of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method includes receiving a configuration of multiple application time values for TCI state updates; receiving DCI in a CORESET associated with a first CORESET pool index associated with a first TRP and including a TCI state associated with a second CORESET pool index associated with a second TRP; transmitting ACK/NACK feedback to one or more TRPs based on a feedback mode configured for the UE; and applying the TCI state indicated in the DCI following the ACK/NACK feedback based on one of the multiple application time values and the feedback mode.

Aspect 2 is the method of aspect 1, where the feedback mode may include one of: a joint feedback mode in which the UE transmits the ACK/NACK feedback to the first TRP, and a separate feedback mode in which the UE transmits the ACK/NACK feedback to the first TRP from which the DCI is received and the second TRP associated with the TCI state indicated in the DCI.

Aspect 3 is the method of any of aspects 1 or 2, where the multiple application time values may include a first application time for a first type of TCI state update from a same TRP to which the update is to be applied, and the multiple application time values may further include one or more of: a second application time for a cross-TRP TCI state update associated with at least one of a first backhaul type or a separate feedback mode, a third application time for the cross-TRP TCI state update associated with at least one of a second backhaul type or a joint feedback mode, a fourth application time for a multiple TRP TCI state update associated with at least one of the first backhaul type or the separate feedback mode, or a fifth application time for the multiple TRP TCI state associated with at least one of the second backhaul type or the joint feedback mode.

Aspect 4 is the method of aspect 3, where the first application time may correspond to the second application time and the fourth application time for an ideal backhaul between the first TRP and the second TRP, and the third application time and the fifth application time may correspond to the first application time plus an additional time period for a non-ideal backhaul between the first TRP and the second TRP.

Aspect 5 is the method of aspect 1, where the multiple application time values may include: a first application time for a first type of TCI state update with feedback to a same TRP to which the update is to be applied, and a second application time for a cross-TRP feedback for a TCI state update.

Aspect 6 is the method of aspect 5, where the second application time may be associated with one or more of: the DCI triggering a beam switch for multiple TRPs, a separate feedback mode, or feedback to the second TRP for the DCI received from the first TRP.

Aspect 7 is the method of any of aspects 1 to 6, where transmitting the ACK/NACK feedback to the one or more TRPs may include: transmitting a first ACK/NACK feedback to the first TRP; and transmitting a second ACK/NACK feedback to the second TRP.

Aspect 8 is the method of aspect 7, where the first ACK/NACK feedback may be transmitted at a first time offset from the DCI, and the second ACK/NACK feedback may be transmitted at a second time offset from the DCI.

Aspect 9 is the method of aspect 8, wherein the DCI may indicate the first time offset and the second time offset.

Aspect 10 is the method of aspect 9, where two DCI fields in the DCI indicate the first time offset and the second time offset.

Aspect 11 is the method of aspect 9, where a single DCI field in the DCI indicates the first time offset and the second time offset.

Aspect 12 is the method of aspect 7, where applying the TCI state indicated in the DCI following the ACK/NACK feedback may include: applying an updated TCI state with the first TRP after a first application time following the first ACK/NACK feedback, and applying the TCI state with the second TRP after a second application time following the second ACK/NACK feedback.

Aspect 13 is the method of aspect 12, where the first application time may correspond to the same length of time as the second application time.

Aspect 14 is an apparatus for wireless communication at a UE, including: a memory; and at least one processor coupled to the memory and, based at least in part on information stored in the memory, the at least one processor is configured to perform the method of any of aspects 1-13.

Aspect 15 is the apparatus of aspect 14, further including at least one of a transceiver or an antenna coupled to the at least one processor and configured to transmit ACK/NACK feedback.

Aspect 16 is an apparatus for wireless communication including means for implementing the method of any of aspects 1-13.

Aspect 17 is a computer-readable medium (e.g., a non-transitory computer-readable medium) storing computer executable code, where the code when executed by a processor causes the processor to implement the method of any of aspects 1-13.

Aspect 18 is a method of wireless communication at a network entity. The method may include configuring multiple application time values for TCI state updates for a UE; providing DCI in a CORESET associated with a first CORESET pool index associated with a first TRP and including a TCI state associated with a second CORESET pool index associated with a second TRP; receiving ACK/NACK feedback from the UE at one or more TRPs based on a feedback mode configured for the UE; and applying the TCI state indicated in the DCI following the ACK/NACK feedback based on one of the multiple application time values and the feedback mode.

Aspect 19 is the method of aspect 18, where the feedback mode may include one of: a joint feedback mode in which the UE transmits the ACK/NACK feedback to the first TRP, and a separate feedback mode in which the UE transmits the ACK/NACK feedback to the first TRP from which the DCI is received and the second TRP associated with the TCI state indicated in the DCI.

Aspect 20 is the method of any of aspects 18 or 19, where the multiple application time values may include a first application time for a first type of TCI state update from the same TRP to which the update is to be applied, and the multiple application time values may further include one or more of: a second application time for a cross-TRP TCI state update associated with at least one of a first backhaul type or a separate feedback mode, a third application time for the cross-TRP TCI state update associated with at least one of a second backhaul type or a joint feedback mode, a fourth application time for a multiple TRP TCI state update associated with at least one of the first backhaul type or the separate feedback mode, or a fifth application time for the multiple TRP TCI state associated with at least one of the second backhaul type or the joint feedback mode.

Aspect 21 is the method of aspect 20, where the first application time may correspond to the second application time and the fourth application time for an ideal backhaul between the first TRP and the second TRP, and the third application time and the fifth application time may correspond to the first application time plus an additional time period for a non-ideal backhaul between the first TRP and the second TRP.

Aspect 22 is the method of aspect 18, where the multiple application time values may include: a first application time for a first type of TCI state update with feedback to a same TRP to which the update is to be applied, and a second application time for a cross-TRP feedback.

Aspect 23 is the method of aspect 22, where the second application time may be associated with one or more of: the DCI triggering a beam switch for multiple TRPs, a separate feedback mode, or feedback to the second TRP for the DCI received from the first TRP.

Aspect 24 is the method of aspect 18, where receiving the ACK/NACK feedback to the one or more TRPs may include: receiving a first ACK/NACK feedback at the first TRP; and receiving a second ACK/NACK feedback at the second TRP.

Aspect 25 is the method of aspect 24, where the first ACK/NACK feedback may be received at a first time offset from the DCI, and the second ACK/NACK feedback may be received at a second time offset from the DCI.

Aspect 26 is the method of aspect 25, where the DCI may indicate the first time offset and the second time offset.

Aspect 27 is the method of aspect 26, where two DCI fields in the DCI indicate the first time offset and the second time offset.

Aspect 28 is the method of aspect 26, where a single DCI field in the DCI indicates the first time offset and the second time offset.

Aspect 29 is the method of aspect 24, where applying the TCI state indicated in the DCI following the ACK/NACK feedback may include: applying an updated TCI state with the first TRP after a first application time following the first ACK/NACK feedback, and applying the TCI state with the second TRP after a second application time following the second ACK/NACK feedback.

Aspect 30 is the method of aspect 29, where the first application time may correspond to the same length of time as the second application time.

Aspect 31 is the method of aspect 24, where the DCI triggers a beam switch for the second TRP, and the start of beam application time for the first TRP and the second TRP is based on the second ACK/NACK feedback received by the second TRP.

Aspect 32 is an apparatus for wireless communication at a network entity, including: a memory; and at least one processor coupled to the memory and, based at least in part on information stored in the memory, the at least one processor is configured to perform the method of any of aspects 18-31.

Aspect 33 is the apparatus of aspect 32, further including at least one of a transceiver or an antenna coupled to the at least one processor and configured to receive ACK/NACK feedback.

Aspect 34 is an apparatus for wireless communication including means for implementing the method of any of aspects 18-31.

Aspect 35 is a computer-readable medium (e.g., a non-transitory computer-readable medium) storing computer executable code, where the code when executed by a processor causes the processor to implement the method of any of aspects 18-31.

Aspect 36 is a method of wireless communication at a network entity. The method may include configuring a single application time for different types of TCI state updates for a UE, the different types of TCI state updates including a first type of TCI state update from the same TRP to which the TCI is to be applied and a cross-TRP TCI state update; providing DCI in a CORESET associated with a first CORESET pool index associated with a first TRP and including a TCI state associated with a second CORESET pool index associated with a second TRP; receiving ACK/NACK feedback from the UE at one or more TRPs based on a feedback mode configured for the UE; and applying the TCI state indicated in the DCI following the ACK/NACK feedback based on the single application time.

Aspect 37 is the method of aspect 36, where the single application time may provide for a delay between TRPs in the cross-TRP TCI state update.

Aspect 38 is the method of aspect 36, where the single application time does not provide for a delay between TRPs in the cross-TRP TCI state update, where the cross-TRP TCI state update is enabled based on one or more of: a backhaul condition between a first TRP and a second TRP associated with the cross-TRP TCI state update, or a feedback mode of the UE.

Aspect 39 is an apparatus for wireless communication at a network entity, including: a memory; and at least one processor coupled to the memory and, based at least in part on information stored in the memory, the at least one processor is configured to perform the method of any of aspects 36-38.

Aspect 40 is the apparatus of aspect 39, further including at least one of a transceiver or an antenna coupled to the at least one processor and configured to receive ACK/NACK feedback.

Aspect 41 is an apparatus for wireless communication including means for implementing the method of any of aspects 36-38.

Aspect 42 is a computer-readable medium (e.g., a non-transitory computer-readable medium) storing computer executable code, where the code when executed by a processor causes the processor to implement the method of any of aspects 36-38.

What is claimed is:

1. An apparatus for wireless communication at a user equipment (UE), comprising:
   memory; and
   at least one processor coupled to the memory and configured to:
   receive a configuration of multiple application time values for transmission configuration indication (TCI) state updates;

receive downlink control information (DCI) in a control resource set (CORESET) associated with a first CORESET pool index associated with a first transmission reception point (TRP) and including a TCI state associated with a second CORESET pool index associated with a second TRP;
transmit acknowledgement/negative acknowledgement (ACK/NACK) feedback to one or more TRPs based on a feedback mode configured for the UE; and
apply the TCI state indicated in the DCI following the ACK/NACK feedback based on one of the multiple application time values and the feedback mode.

2. The apparatus of claim 1, wherein the feedback mode includes one of:
a joint feedback mode in which the UE transmits the ACK/NACK feedback to the first TRP, and
a separate feedback mode in which the UE transmits the ACK/NACK feedback to the first TRP from which the DCI is received and the second TRP associated with the TCI state indicated in the DCI.

3. The apparatus of claim 1, wherein the multiple application time values include a first application time for a first type of TCI state update from a same TRP to which the TCI state update is to be applied, and the multiple application time values further include one or more of:
a second application time for a cross-TRP TCI state update associated with at least one of a first backhaul type or a separate feedback mode,
a third application time for the cross-TRP TCI state update associated with at least one of a second backhaul type or a joint feedback mode,
a fourth application time for a multiple TRP TCI state update associated with at least one of the first backhaul type or the separate feedback mode, or
a fifth application time for the multiple TRP TCI state update associated with at least one of the second backhaul type or the joint feedback mode.

4. The apparatus of claim 3, wherein the first application time corresponds to the second application time and the fourth application time for an ideal backhaul between the first TRP and the second TRP, and the third application time and the fifth application time correspond to the first application time plus an additional time period for a non-ideal backhaul between the first TRP and the second TRP.

5. The apparatus of claim 1, wherein the multiple application time values include:
a first application time for a first type of TCI state update with feedback to a same TRP to which the TCI state update is to be applied, and
a second application time for a cross-TRP feedback.

6. The apparatus of claim 5, wherein the second application time is associated with one or more of:
the DCI triggering a beam switch for multiple TRPs,
a separate feedback mode, or
the feedback to the second TRP for the DCI received from the first TRP.

7. The apparatus of claim 1, wherein to transmit the ACK/NACK feedback to the one or more TRPs, the at least one processor is configured to:
transmit a first ACK/NACK feedback to the first TRP; and
transmit a second ACK/NACK feedback to the second TRP.

8. The apparatus of claim 7, wherein the first ACK/NACK feedback is transmitted at a first time offset from the DCI, and the second ACK/NACK feedback is transmitted at a second time offset from the DCI.

9. The apparatus of claim 8, wherein the DCI indicates the first time offset and the second time offset.

10. The apparatus of claim 9, wherein two DCI fields in the DCI indicate the first time offset and the second time offset.

11. The apparatus of claim 9, wherein a single DCI field in the DCI indicates the first time offset and the second time offset.

12. The apparatus of claim 7, wherein, to apply the TCI state indicated in the DCI following the ACK/NACK feedback, the at least one processor is configured to:
apply an updated TCI state with the first TRP after a first application time following the first ACK/NACK feedback, and
apply the TCI state with the second TRP after a second application time following the second ACK/NACK feedback.

13. The apparatus of claim 12, wherein the first application time corresponds to a same length of time as the second application time.

14. An apparatus for wireless communication at a network entity, comprising:
memory; and
at least one processor coupled to the memory and configured to:
configure multiple application time values for transmission configuration indication (TCI) state updates for a user equipment (UE);
provide downlink control information (DCI) in a control resource set (CORESET) associated with a first CORESET pool index associated with a first transmission reception point (TRP) and including a TCI state associated with a second CORESET pool index associated with a second TRP;
receive acknowledgement/negative acknowledgement (ACK/NACK) feedback from the UE at one or more TRPs based on a feedback mode configured for the UE; and
apply the TCI state indicated in the DCI following the ACK/NACK feedback based on one of the multiple application time values and the feedback mode.

15. The apparatus of claim 14, wherein the feedback mode includes one of:
a joint feedback mode in which the UE transmits the ACK/NACK feedback to the first TRP, and
a separate feedback mode in which the UE transmits the ACK/NACK feedback to the first TRP from which the DCI is received and the second TRP associated with the TCI state indicated in the DCI.

16. The apparatus of claim 14, wherein the multiple application time values include a first application time for a first type of TCI state update from a same TRP to which the TCI state update is to be applied, and the multiple application time values further include one or more of:
a second application time for a cross-TRP TCI state update associated with at least one of a first backhaul type or a separate feedback mode,
a third application time for the cross-TRP TCI state update associated with at least one of a second backhaul type or a joint feedback mode,
a fourth application time for a multiple TRP TCI state update associated with at least one of the first backhaul type or the separate feedback mode, or
a fifth application time for the multiple TRP TCI state update associated with at least one of the second backhaul type or the joint feedback mode.

17. The apparatus of claim 16, wherein the first application time corresponds to the second application time and the fourth application time for an ideal backhaul between the first TRP and the second TRP, and the third application time and the fifth application time correspond to the first application time plus an additional time period for a non-ideal backhaul between the first TRP and the second TRP.

18. The apparatus of claim 14, wherein the multiple application time values include:
a first application time for a first type of TCI state update with feedback to a same TRP to which the TCI state update is to be applied, and
a second application time for a cross-TRP feedback.

19. The apparatus of claim 18, wherein the second application time is associated with one or more of:
the DCI triggering a beam switch for multiple TRPs,
a separate feedback mode, or
the feedback to the second TRP for the DCI received from the first TRP.

20. The apparatus of claim 14, wherein, to receive the ACK/NACK feedback at the one or more TRPs, the at least one processor is configured to:
receive a first ACK/NACK feedback at the first TRP; and
receive a second ACK/NACK feedback at the second TRP.

21. The apparatus of claim 20, wherein the first ACK/NACK feedback is received at a first time offset from the DCI, and the second ACK/NACK feedback is received at a second time offset from the DCI.

22. The apparatus of claim 21, wherein the DCI indicates the first time offset and the second time offset.

23. The apparatus of claim 22, wherein two DCI fields in the DCI indicate the first time offset and the second time offset.

24. The apparatus of claim 22, wherein a single DCI field in the DCI indicates the first time offset and the second time offset.

25. The apparatus of claim 20, wherein, to apply the TCI state indicated in the DCI following the ACK/NACK feedback, the at least one processor is configured to:
apply an updated TCI state with the first TRP after a first application time following the first ACK/NACK feedback, and
apply the TCI state with the second TRP after a second application time following the second ACK/NACK feedback.

26. The apparatus of claim 25, wherein the first application time corresponds to a same length of time as the second application time.

27. The apparatus of claim 20, wherein the DCI triggers a beam switch for the second TRP, and a start of beam application time for the first TRP and the second TRP is based on the second ACK/NACK feedback received by the second TRP.

28. An apparatus for wireless communication at a network entity, comprising:
memory; and
at least one processor coupled to the memory and configured to:
configure a single application time for different types of transmission configuration indication (TCI) state updates for a user equipment (UE), the different types of TCI state updates including a first type of TCI state update from a same transmission and reception point (TRP) to which the TCI state update is to be applied and a cross-TRP TCI state update;
provide downlink control information (DCI) in a control resource set (CORESET) associated with a first CORESET pool index associated with a first TRP and including a TCI state associated with a second CORESET pool index associated with a second TRP;
receive acknowledgement/negative acknowledgement (ACK/NACK) feedback from the UE at one or more TRPs based on a feedback mode configured for the UE; and
apply the TCI state indicated in the DCI following the ACK/NACK feedback based on the single application time.

29. The apparatus of claim 28, wherein:
the single application time provides for a delay between the first TRP and the second TRP in the cross-TRP TCI state update, or,
the single application time does not provide for the delay between the first TRP and the second TRP in the cross-TRP TCI state update, and the cross-TRP TCI state update is enabled based on one or more of: a backhaul condition between the first TRP and the second TRP associated with the cross-TRP TCI state update, or the feedback mode of the UE.

30. A method for wireless communication at a user equipment (UE), comprising:
receiving a configuration of multiple application time values for transmission configuration indication (TCI) state updates;
receiving downlink control information (DCI) in a control resource set (CORESET) associated with a first CORESET pool index associated with a first transmission reception point (TRP) and including a TCI state associated with a second CORESET pool index associated with a second TRP;
transmitting acknowledgement/negative acknowledgement (ACK/NACK) feedback to one or more TRPs based on a feedback mode configured for the UE; and
applying the TCI state indicated in the DCI following the ACK/NACK feedback based on one of the multiple application time values and the feedback mode.

* * * * *